United States Patent
Inagaki et al.

(10) Patent No.: US 7,458,445 B2
(45) Date of Patent: Dec. 2, 2008

(54) PARKING BRAKE SYSTEM

(75) Inventors: Hiromi Inagaki, Saitama (JP); Masaaki Myoi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/592,617

(22) PCT Filed: Mar. 28, 2005

(86) PCT No.: PCT/JP2005/005731

§ 371 (c)(1),
(2), (4) Date: May 18, 2007

(87) PCT Pub. No.: WO2005/093280

PCT Pub. Date: Oct. 6, 2005

(65) Prior Publication Data

US 2008/0017459 A1 Jan. 24, 2008

(30) Foreign Application Priority Data

Mar. 26, 2004 (JP) ............................. 2004-093584
Mar. 31, 2004 (JP) ............................. 2004-107449

(51) Int. Cl.
*F16D 65/32* (2006.01)
(52) U.S. Cl. .................................... 188/72.7; 188/71.9
(58) Field of Classification Search ........ 188/71.7–72.9, 188/106 A, 106 F, 325, 343
See application file for complete search history.

(56) References Cited

U.S. PATENT DOCUMENTS

| 3,362,506 | A | * | 1/1968 | Mossey | 188/343 |
| 3,507,367 | A | * | 4/1970 | Brown et al. | 188/106 F |
| 3,513,946 | A | * | 5/1970 | Rick | 188/325 |
| 3,752,266 | A | * | 8/1973 | Chouings | 188/170 |
| 3,874,747 | A | * | 4/1975 | Case et al. | 303/89 |
| 3,977,500 | A | * | 8/1976 | Farr | 188/106 A |
| 4,064,973 | A | * | 12/1977 | Deem et al. | 188/71.7 |
| 4,194,596 | A | * | 3/1980 | Garrett et al. | 188/72.7 |
| 4,621,713 | A | * | 11/1986 | Carre et al. | 188/72.7 |
| 4,719,997 | A | * | 1/1988 | Tsuruta | 188/71.9 |
| 4,723,626 | A | | 2/1988 | Carr et al. | |
| 4,784,244 | A | * | 11/1988 | Carre et al. | 188/156 |

(Continued)

FOREIGN PATENT DOCUMENTS

JP 54-035565 3/1979

(Continued)

*Primary Examiner*—Christopher P Schwartz
(74) *Attorney, Agent, or Firm*—Carrier, Blackman & Associates, P.C.; William D. Blackman; Joseph P. Carrier

(57) ABSTRACT

A parking brake system having a lock mechanism provided within a casing to the rear of a parking piston that provides a parking brake mode by forward movement of a lock mechanism in response to the action of a parking control fluid pressure. The lock mechanism responds to forward movement of the parking piston to mechanically lock the parking piston at a forward position and unlocking in response to the action of a parking release control fluid pressure. The lock mechanism includes a lock piston that is to the rear of the parking piston having an axis orthogonal to the axis of the parking piston. This enables an automatic parking brake mode to be obtained by a simple structure without consuming power.

16 Claims, 13 Drawing Sheets

U.S. PATENT DOCUMENTS

| | | | |
|---|---|---|---|
| 5,662,020 A | 9/1997 | Morita et al. | |
| 5,954,162 A | 9/1999 | Feigel et al. | |
| 7,188,710 B2 * | 3/2007 | Reuter et al. | 188/72.7 |
| 2005/0258682 A1 * | 11/2005 | Halasy-Wimmer et al. | 303/89 |
| 2006/0071546 A1 * | 4/2006 | Inagaki et al. | 303/115.1 |

FOREIGN PATENT DOCUMENTS

| | | |
|---|---|---|
| JP | 62-37531 | 2/1987 |
| JP | 04-154468 | 5/1992 |
| JP | 06-071348 | 3/1994 |
| JP | 09-108981 | 4/1997 |
| JP | 10-512947 | 12/1998 |
| JP | 2000-504811 | 4/2000 |

* cited by examiner

PARKING BRAKE SYSTEM

TECHNICAL FIELD

The present invention relates to a parking brake system and, in particular, to a parking brake system in which a parking brake state is obtained by locking a brake piston in its operating state.

BACKGROUND ART

Such a parking brake system is already known from, for example, Patent Publications 1 and 2.
Patent Publication 1: Japanese Patent Publication (PCT) No. 10-512947
Patent Publication 2: Japanese Patent Publication (PCT) No. 2000-504811

DISCLOSURE OF INVENTION

Problems to be Solved by the Invention

In Patent Publication 1, the brake piston is divided into front and rear brake pistons, a spring is provided in a compressed state between a transmission member abutting against the front end of the rear brake piston and a blocking plate fixed to the front brake piston, a latch capable of meshing with inner teeth cut into an inner face of a brake caliper to the rear of the front brake piston is housed within the brake caliper so as to engage with the inner teeth in a state in which the transmission member abuts against the front end of the rear brake piston but disengage from the inner teeth due to the urging force of the spring when the transmission member moves forward relative to the front end of the rear brake piston, and an auxiliary piston is slidably fitted into the rear brake piston, the auxiliary piston being capable of moving the transmission member in the axial direction relative to the rear brake piston. Since it is necessary to cut the inner teeth on the inner face of the brake caliper and house the latch within the brake caliper while dividing the brake piston into the front and rear brake pistons, the structure of the interior of the brake caliper is complicated.

Furthermore, in Patent Publication 2, an adjustment bolt having its front end part fixedly connected to the brake piston is screwed into an adjustment nut, an electromagnet exhibiting an electromagnetic force for making the adjustment nut frictionally engage with a casing is disposed within a brake caliper to the rear of the adjustment nut, and when obtaining a parking brake state, the electromagnet makes the adjustment nut frictionally engage with the casing in a state in which brake fluid pressure acts on the brake piston, thus preventing the brake piston from retreating. However, not only is it necessary to house the electromagnet within the brake caliper, thus making the structure complicated, but it is also necessary to maintain an energized state of a winding of the electromagnet in the parking brake state, thus increasing the power consumption.

The present invention has been accomplished under the above-mentioned circumstances, and it is an object thereof to provide a parking brake system that enables a parking brake state to be obtained by a simple structure without consuming power.

Means for Solving the Problems

In order to achieve the above object, in accordance with a first aspect of the present invention, there is provided a parking brake system comprising: a parking piston slidably fitted into a casing so that a parking brake state can be obtained by forward movement in response to a parking control fluid pressure acting on a rear face side of the parking piston; a lock mechanism provided within the casing to the rear side of the parking piston so as to automatically lock in response to forward movement of the parking piston in order to mechanically lock the parking piston at a forward position and unlock in response to a parking release control fluid pressure acting on the lock mechanism; a fluid pressure source; and fluid pressure control means for controlling a fluid pressure generated by the fluid pressure source so that the parking control fluid pressure and the parking release control fluid pressure can be obtained; the lock mechanism comprising a lock piston that is disposed to the rear of the parking piston while having an axis orthogonal to the axis of the parking piston and that makes a forward urging force act on the parking piston at least when the parking piston moves forward, and opposite end parts of the lock piston being slidably fitted into and supported on the casing.

Further, in accordance with a second aspect of the present invention, there is provided a parking brake system comprising: a parking piston slidably fitted into a casing so that a parking brake state can be obtained by forward movement in response to a parking control fluid pressure acting on a rear face side of the parking piston; a lock mechanism provided within the casing so as to automatically lock in response to forward movement of the parking piston in order to mechanically lock the parking piston at a forward position and unlock in response to a parking release control fluid pressure acting on the lock mechanism; a fluid pressure source; and fluid pressure control means for controlling a fluid pressure generated by the fluid pressure source so that the parking control fluid pressure and the parking release control fluid pressure can be obtained; the lock mechanism comprising a lock piston that is slidably fitted into the casing with its rotational position restricted while having an axis that is orthogonal to the axis of the parking piston so that at least when the parking piston moves forward an urging force toward one side in the axial direction acts on the lock piston and that is arranged such that a parking release control pressure can act on the lock piston toward the other side in the axial direction, a spherical retaining part that is provided on the parking piston or a stopper coupled to the parking piston, and a locking part that is provided at one end, in the axial direction, of the lock piston while having an engagement face that is recessed in an arc shape in order to mechanically lock the forward operating position of the parking piston by abutting against and engaging with the retaining part from the rear, and that is inclined so as to be positioned to the rear in the axial direction of the parking piston, in going toward one side in the axial direction of the lock piston.

EFFECTS OF THE INVENTION

In accordance with the first aspect of the present invention, since making the parking control fluid pressure act on the rear face of the parking piston makes the parking piston move forward and the lock mechanism mechanically lock the forward position of the parking piston, it is possible to obtain a parking brake state automatically; furthermore, when releasing the parking brake state, the parking release control fluid pressure may be made to act on the lock mechanism, and it is possible to automatically obtain a parking brake state by a simple structure without consuming power in the parking brake state.

Moreover, the lock mechanism is disposed to the rear of the parking piston so that, when the parking piston moves forward, a forward urging force acts on the parking piston, the lock mechanism including the lock piston whose opposite end parts are slidably supported on the casing, the lock piston can be supported at two points by the casing so that, when the parking piston is locked in a forwardly moved state, the reaction acting on the lock piston is distributed between axially opposite ends of the lock piston, the casing can be made light by avoiding any increase in thickness in order to increase the strength of a portion of the casing that supports the lock piston and, furthermore, the axial length of the casing can be reduced by making the axial length of a portion of the casing that houses the lock piston relatively short.

In accordance with the second aspect of the present invention, since making the parking control fluid pressure act on the rear face side of the parking piston makes the parking piston move forward and the lock mechanism mechanically lock the forward position of the parking piston, it is possible to obtain the parking brake state automatically; furthermore, when releasing the parking brake state, the parking release control fluid pressure may be made to act on the lock mechanism, and it is possible to automatically obtain a parking brake state by a simple structure without consuming power in the parking brake state.

Furthermore, the lock mechanism includes the lock piston, which is slidably fitted into the casing in a state in which its rotational position is restricted and has an axis orthogonal to the axis of the parking piston so that when the parking piston moves forward the lock piston moves in a direction orthogonal to the axis of the parking piston, the spherical retaining part, which is provided on the parking piston or the stopper coupled to the parking piston, and the locking part, which is provided at one end in the axial direction of the lock piston and has the engagement face that is recessed in an arc shape so as to abut against and engage with the retaining part from the rear. The contact area between the retaining face and the engagement face in a state in which the parking piston has moved forward can therefore be made relatively large, it is thus possible to suppress wear, buckling, etc. due to the load applied from the parking piston side to the abutment and engagement parts between the lock piston and the stopper or the parking piston, the durability can be improved, and contact and engagement between the retaining part and the engagement face can be made reliable.

Moreover, since the engagement face is inclined so that in going toward one side in the axial direction of the lock piston it is positioned to the rear in the axial direction of the parking piston, when releasing the lock, the lock piston can be moved effortlessly from the locked state toward the other side in the axial direction, the forward position of the parking piston can be mechanically locked in accordance with a change in the amount of forward movement from a retreat limit of the parking piston in the parking brake state and, furthermore, a change in the stroke of the parking piston according to dimensional tolerance, assembly error, or wear of a frictional member can be dealt with.

EXPLANATION OF REFERENCE NUMERALS AND SYMBOLS

| | |
|---|---|
| 10A, 10B | Pump as Fluid Pressure Source |
| 23, 126 | Casing |
| 24, 133 | Parking Piston |
| 25 | Lock Mechanism |
| 30 | Lock Piston |
| 40A, 40B | Fluid Pressure Control Means |
| 136 | Stopper |
| 143 | Lock Mechanism |
| 145 | Retaining Part |
| 146 | Locking Part |
| 146a | Engagement Face |
| 155 | Fluid Pressure Source |
| 156 | Fluid Pressure Control Means |
| M | Master Cylinder as Fluid Pressure Source |

BEST MODE FOR CARRYING OUT THE INVENTION

Modes for carrying out the present invention are explained below by reference to Embodiments of the present invention shown in the attached drawings.

Embodiment 1

FIG. 1 to FIG. 4 show a first embodiment of the present invention.

Figure 1:
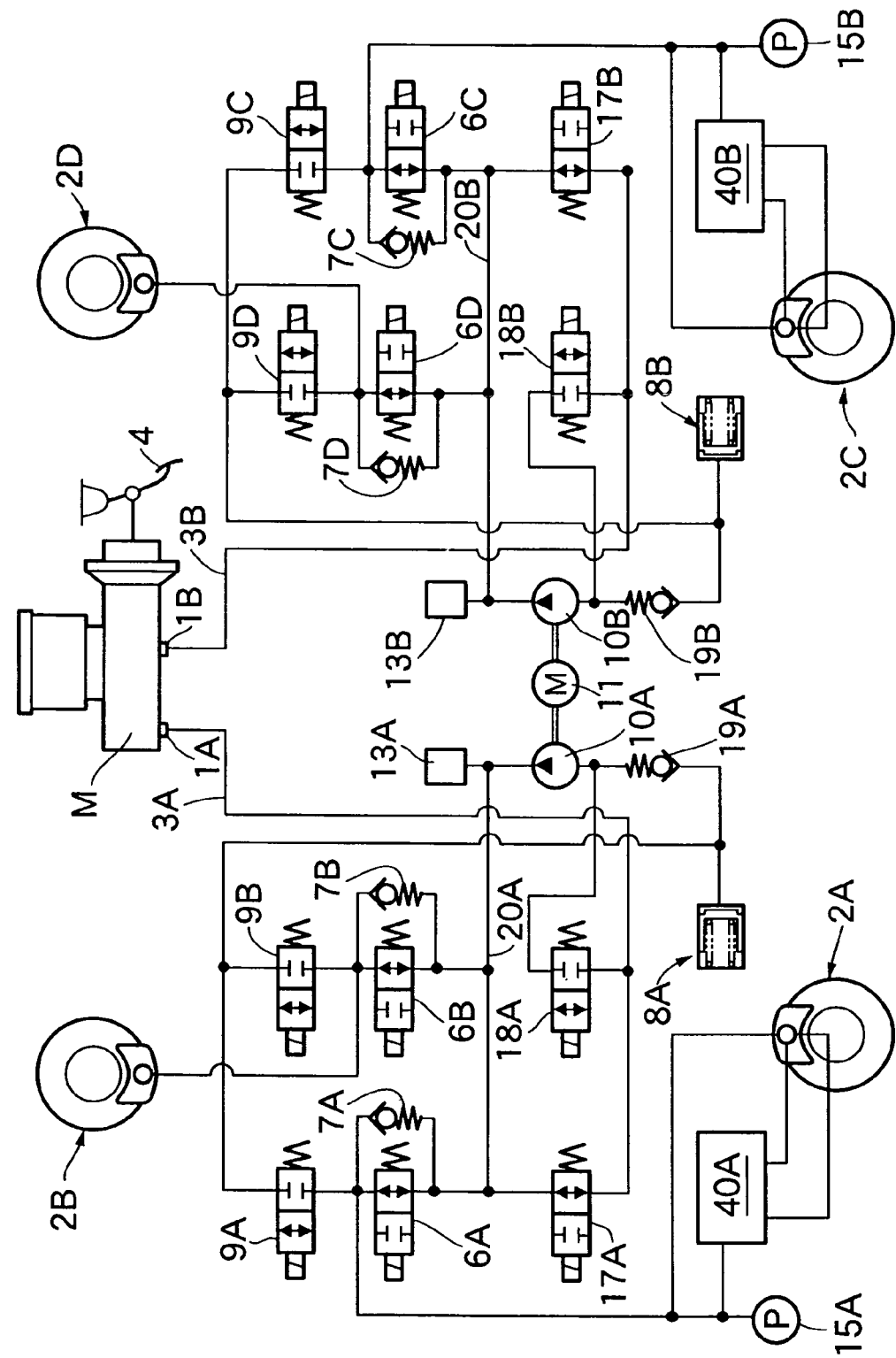
FIG. 1 is a fluid pressure circuit diagram of a vehicle brake system (first embodiment).

Referring first to FIG. 1, a tandem type master cylinder M includes first and second output ports 1A and 1B for generating a brake fluid pressure according to a depressing force that is applied by a vehicle driver to a brake pedal P; the first output port 1A is connected to a first output fluid pressure line 3A, and the second output port 1B is connected to a second output fluid pressure line 3B.

The first output fluid pressure line 3A is connected to a first fluid pressure line 20A via a cut valve 17A, which is a normally open solenoid valve, and the second output fluid pressure line 3B is connected to a second fluid pressure line 20B via a cut valve 17B, which is a normally open solenoid valve.

The first fluid pressure line 20A is connected to a front left wheel brake 2A, which is a disk brake equipped with a parking brake mechanism, via an inlet valve 6A, which is a normally open solenoid valve, and is also connected to a rear right wheel brake 2B, which is a disk brake, via an inlet valve 6B, which is a normally open solenoid valve. Furthermore, the second fluid pressure line 20B is connected to a front right wheel brake 2C, which is a disk brake equipped with a parking brake mechanism, via an inlet valve 6C, which is a normally open solenoid valve, and is also connected to a rear left wheel brake 2D, which is a disk brake, via an inlet valve 6D, which is a normally open solenoid valve. Moreover, the inlet valves 6A to 6D are connected in series to check valves 7A to 7D respectively.

Provided between a first reservoir 8A, which corresponds to the first fluid pressure line 20A, and the front left wheel brake 2A and rear right wheel brake 2B are outlet valves 9A and 9B respectively, which are normally closed solenoid valves; and provided between a second reservoir 8B, which corresponds to the second fluid pressure line 20B, and the front right wheel brake 2C and rear left wheel brake 2D are outlet valves 9C and 9D respectively, which are normally closed solenoid valves.

The first and second reservoirs 8A and 8B are connected to intake sides of first and second pumps 10A and 10B driven by a common electric motor 11 via one-way valves 19A and 19B that allow the flow of brake fluid to the pumps 10A and 10B. The first and second output fluid pressure lines 3A and 3B are connected to points between the first and second pumps 10A and 10B and the one-way valves 19A and 19B via suction valves 18A and 18B, which are normally closed solenoid valves, and the first and second fluid pressure lines 20A and 20B are connected to discharge sides of the first and second pumps 10A and 10B via first and second dampers 13A and 13B.

At a time of normal braking when there is no possibility of the wheels locking, each of the inlet valves 6A to 6D is put into a de-energized valve-open state, each of the outlet valves 9A to 9D is put into a de-energized valve-closed state, and the brake fluid pressure outputted from the first output port 1A of the master cylinder M acts on the front left wheel and rear right wheel brakes 2A and 2B via the inlet valves 6A and 6B. Furthermore, the brake fluid pressure outputted from the second output port 1B of the master cylinder M acts on the front right wheel and rear left wheel brakes 2C and 2D via the inlet valves 6C and 6D.

When a wheel nearly comes into a locked state during the above-mentioned braking, among the inlet valves 6A to 6D, the inlet valve corresponding to the wheel that has nearly come into the locked state is energized and closed, and among the outlet valves 9A to 9D, the outlet valve corresponding to the above wheel is energized and opened. Part of the brake fluid pressure on the wheel that has nearly come into the locked state is thereby absorbed by the first reservoir 8A or the second reservoir 8B, and the brake fluid pressure on the wheel that has nearly come into the locked state is reduced.

Furthermore, when maintaining the brake fluid pressure at a constant level, the inlet valves 6A to 6D are energized and closed and the outlet valves 9A to 9D are de-energized and closed and, moreover, when increasing the brake fluid pressure, the inlet valves 6A to 6D may be put into a de-energized valve-open state, and the outlet valves 9A to 9D may be put into a de-energized valve-closed state.

Controlling the de-energization/energization of each of the inlet valves 6A to 6D and each of the outlet valves 9A to 9D in this way enables the wheels to be braked efficiently without being locked.

During the above-mentioned antilock brake control, the electric motor 11 is rotationally operated, the first and second pumps 10A and 10B are driven accompanying the operation of the electric motor 11, and the brake fluid absorbed by the first and second reservoirs 8A and 8B is therefore taken into the first and second pumps 10A and 10B and then circulated to the first and second output fluid pressure lines 3A and 3B via the first and second dampers 13A and 13B. Due to such circulation of the brake fluid, it is possible to prevent any increase in the amount by which the brake pedal P is depressed due to the first and second reservoirs 8A and 8B absorbing the brake fluid. Moreover, pulsation of the discharge pressure of the first and second pumps 10A and 10B is suppressed by operation of the first and second dampers 13A and 13B, and the above circulation does not impair the operational feel of the brake pedal P.

By operating the electric motor 11 in a state in which the suction valves 18A and 18B are energized and opened and the cut valves 17A and 17B are energized and closed, the first and second pumps 10A and 10B, which function as fluid pressure sources, take in the brake fluid from the master cylinder M side and discharge pressurized brake fluid into the first and second fluid pressure lines 20A and 20B.

Furthermore, pressure sensors 15A and 15B for detecting brake fluid pressure are connected to the front left wheel and front right wheel brakes 2A and 2C.

Figure 2:
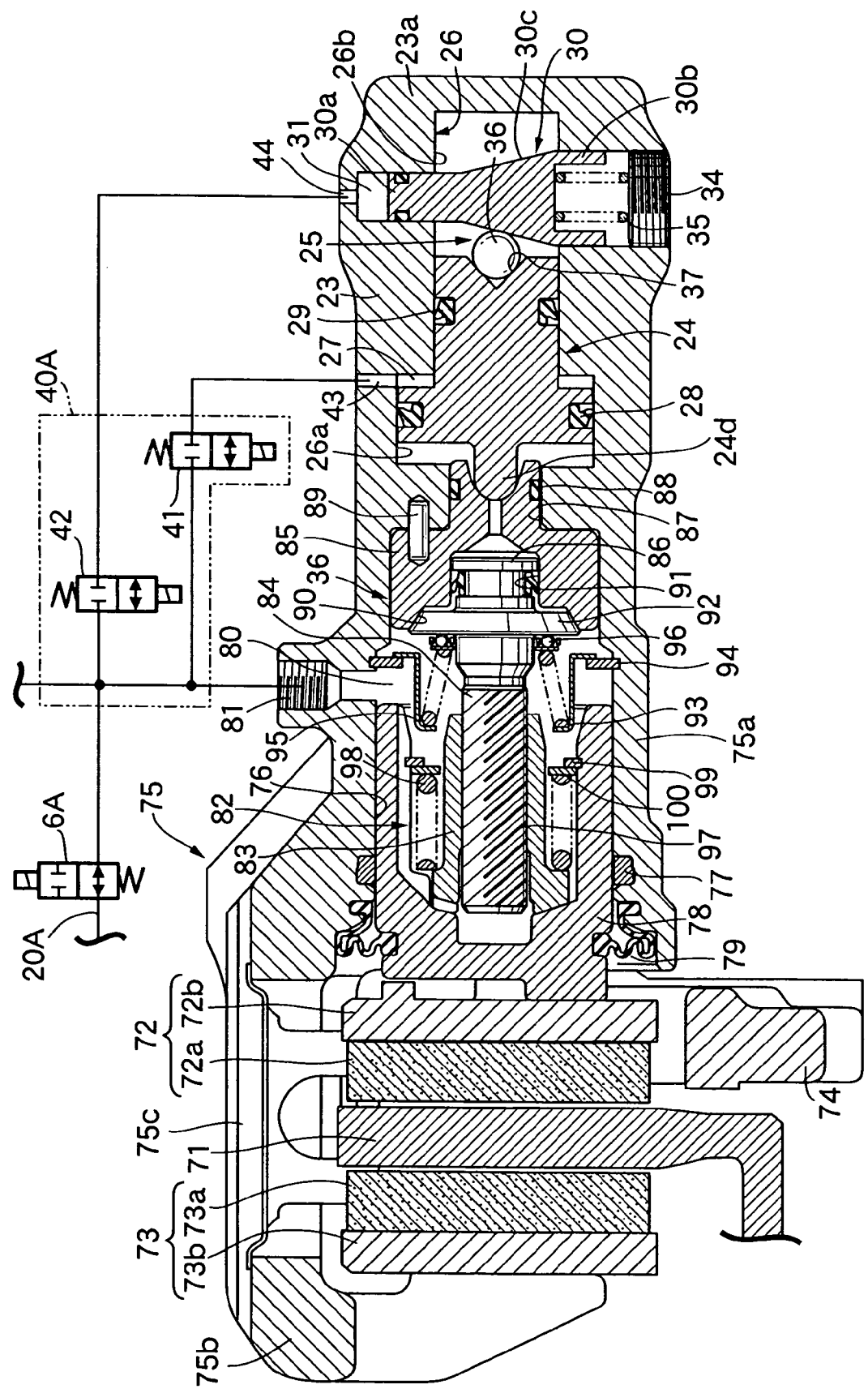
FIG. 2 is a longitudinal sectional view of a disk brake at a time of non-parking braking (first embodiment).

In FIG. 2, in the front left wheel brake 2A, which is the disk brake equipped with the parking brake mechanism, a first friction pad 72 and a second friction pad 73 are disposed so as to oppose each other on opposite sides of a brake disk 71 that rotates together with the wheel. These first and second friction pads 72 and 73 are formed from linings 72a and 73a that can abut against the brake disk 71, and back plates 72b and 73b fixed to rear face sides of the linings 72a and 73a, and the back plates 72b and 73b are supported, so that they can move freely in the axial direction of a brake piston 78, on a bracket 74 fixed to a vehicle body. Furthermore, a brake caliper 75 straddling the first and second friction pads 72 and 73 is supported on the bracket 74 so that it can move freely in the axial direction of the brake piston 78.

The brake caliper 75 includes a first clamping arm 75a facing the back plate 72b of the first friction pad 72 and a second clamping arm 75b facing the back plate 73b of the second friction pad 73, and the first and second clamping arms 75a and 75b are integrally connected via a bridging part 75c running past an outer peripheral part of the brake disk 71. A cylinder hole 76 is provided in the first clamping arm 75a, and the brake piston 78, which has a cup shape, is slidably fitted into the cylinder hole 76 via a seal 77. A forward end part of the brake piston 78 facing the back plate 72b of the first friction pad 72 so as to be able to abut thereagainst is connected to an open end of the cylinder hole 76 by a bellows-shaped dust cover 79; furthermore, a brake fluid pressure chamber 80 is formed within the first clamping arm 75a, the rear face of brake piston 78 facing the brake fluid pressure chamber 80, and the brake fluid pressure chamber 80 is connected to the inlet valve 6A via a port 81 provided in the first clamping arm 75a.

An adjustment mechanism 82 is provided within the first clamping arm 75a of the brake caliper 75, and this adjustment mechanism 82 includes an adjustment nut 83, an adjustment bolt 84, a relay piston 85, and a small piston 86, the adjustment nut 83 being connected to the brake piston 78 so that relative rotation is not possible and housed within the brake fluid pressure chamber 80, the adjustment bolt 84 having its front end part screwed into the adjustment nut 83, the relay piston 85 being disposed in a rear part of the brake fluid pressure chamber 80 and slidably fitted into the brake caliper 75 in a fluid-tight manner so that it cannot rotate around the axis but can move in the axial direction, and the small piston 86 being connected integrally and coaxially to a rear part of the adjustment bolt 84, slidably fitted into the relay piston 85 in a fluid-tight manner, and resiliently urged in a direction in which it frictionally engages with the relay piston 85.

A relay cylinder hole 87 having a smaller diameter than that of the cylinder hole 76 is provided coaxially in an end part, on the side opposite to the brake disk 71, of the first clamping arm 75a of the brake caliper 75, and a stepped rear part of the relay piston 85 is slidably fitted into the relay cylinder hole 87 via a seal 88 while a front part of the relay piston 85 is inserted into a rear part of the cylinder hole 76. Moreover, opposite end parts of a restricting pin 89 are fitted into the brake caliper 75 and the relay piston 85, the restricting pin 89 being disposed at a position offset from the axis of the cylinder hole 76 so as to have an axis that is parallel to the cylinder hole 76 and the relay cylinder hole 87. The relay piston 85 is thereby prevented from rotating around an axis that is coaxial with the cylinder hole 76 and the relay cylinder hole 87 and is supported by the brake caliper 75 so that it can move along the axis.

A small cylinder hole 91 is coaxially provided in the relay piston 85, the small cylinder hole 91 having a tapered clutch face 90 in an opening at the front end. A movable clutch body 92 and the small piston 86 are coaxially and integrally connected to a rear part of the adjustment bolt 84, the movable clutch body 92 being capable of frictionally engaging with the clutch face 90, and the small piston 86 being slidably fitted into the small cylinder hole 91 in a fluid-tight manner.

One end of a clutch spring 93 exhibiting a spring force for frictionally engaging the movable clutch body 92 with the clutch face 90 of the relay piston 85 abuts against a retainer 95 engaged with and supported by a clip 94 mounted on an inner face of the cylinder hole 76, and the other end of the clutch spring 93 abuts against the movable clutch body 92 via a ball bearing 96.

The adjustment nut 83 and the adjustment bolt 84 mesh with each other by means of a steep thread 97 having a plurality of threads and grooves having a coarse pitch. One end of an over-adjustment prevention spring 98 exhibiting a spring force urging the adjustment nut 83 toward the brake piston 78 abuts against the adjustment nut 83, and the other end of the over-adjustment prevention spring 98 abuts against and is supported by a retainer 100 engaged with and supported by a clip 99 mounted on an inner face of the brake piston 78.

The adjustment nut 83 and the brake piston 78 are unable to rotate relative to each other due to interlocking of the abutment parts thereof, and the back plate 72b of the first friction pad 72 and the brake piston 78 are unable to rotate relative to each other due to interlocking thereof.

In such an adjustment mechanism 82, when a fluid pressure is supplied to the brake fluid pressure chamber 80 at a time of normal braking, the brake piston 78, which has received the fluid pressure, moves leftward in FIG. 2 within the cylinder hole 76 while elastically deforming the seal 77, and presses the first friction pad 72 against one side of the brake disk 71; due to its reaction the brake caliper 75 moves rightward, which is a direction opposite to the direction in which the brake piston 78 has moved, and the second clamping arm 75b presses the second friction pad 73 against the other side of the brake disk 71. As a result, the first and second friction pads 72 and 73 abut against opposite sides of the brake disk 71 with an equal surface pressure, thus generating a braking force for braking the wheel.

During the above braking, the fluid pressure supplied to the brake fluid pressure chamber 80 does not generate an axial load on the adjustment nut 83, but generates a rightward load on the movable clutch body 92 integral with the adjustment bolt 84 meshing with the adjustment nut 83, the rightward load having a magnitude corresponding to the product of the cross-sectional area of the small piston 86 and the above fluid pressure, and a frictional engagement force according to the load acts between the movable clutch body 92 and the clutch face 90 of the relay piston 85.

When braking normally, since the fluid pressure acting on the brake fluid pressure chamber 80 is relatively small, the frictional engagement force acting between the movable clutch body 92 and the relay piston 85 is also relatively small. Because of this, when the brake piston 78 moves forward accompanying the progress of wear of the linings 72a and 73a of the first and second friction pads 72 and 73, the adjustment nut 83 moves forward together with the brake piston 78 due to the resilient force of the over-adjustment prevention spring 98, and the movable clutch body 92 integral with the adjustment bolt 84 meshing with the adjustment nut 83 is detached from the clutch face 90 of the relay piston 85 against the fluid pressure acting on the brake fluid pressure chamber 80 and the resilient force of the clutch spring 93.

When the movable clutch body 92 detaches from the clutch face 90 of the relay piston 85, the adjustment bolt 84, which is urged rightward by the fluid pressure acting on the movable clutch body 92 and the resilient force of the clutch spring 93, moves to the right while rotating in the steep thread 97 relative to the adjustment nut 83, which is unable to rotate, and the movable clutch body 92 re-engages with the clutch face 90 of the relay piston 85. In this process, the movable clutch body 92 can rotate smoothly due to the action of the ball bearing 96 disposed between the movable clutch body 92 and the clutch spring 93.

In this way, accompanying the progress of wear of the linings 72a and 73a of the first and second friction pads 72 and 73, the adjustment nut 83 moves to the left relative to the adjustment bolt 84 so as to compensate for the amount of wear, and it is therefore possible to automatically maintain a constant clearance between the brake disk 71 and the linings 72a and 73a of the first and second friction pads 72 and 73 when not braking.

When the fluid pressure acting on the brake fluid pressure chamber 80 is decreased in order to release the braking state, although the brake piston 78 retreats due to the deformation restoration force of the seal 77, since the retreating force makes the movable clutch body 92 engage with the clutch face 90 of the relay piston 85 via the adjustment nut 83 and the adjustment bolt 84, rotation of the adjustment bolt 84 relative to the adjustment nut 83 is restricted. The brake piston 78 therefore can only retreat by a stroke corresponding to the backlash between the adjustment nut 83 and the adjustment bolt 84, thereby giving an appropriate clearance, corresponding to the above backlash, between the first and second friction pads 72 and 73 and the brake disk 71.

When hard braking is carried out, the above-mentioned automatic adjustment is carried out until the fluid pressure of the brake fluid pressure chamber 80 increases up to a predetermined value that deforms the brake caliper 75, and when the fluid pressure exceeds the predetermined value, since the movable clutch body 92 is pressed firmly against the clutch face 90 of the relay piston 85 due to the fluid pressure, the movable clutch body 92 and the relay piston 85 are joined so that they cannot rotate relative to each other. As a result, since the adjustment bolt 84 is restrained so that it does rotate, and the adjustment nut 83, which is intrinsically unable to rotate, remains on the adjustment bolt 84, when the brake piston 78 moves further forward accompanying elastic deformation of the brake caliper 75 due to the fluid pressure, it is only the brake piston 78 that moves forward while compressing the over-adjustment prevention spring 98, leaving the adjustment nut 83 behind. In this way, when hard braking is carried out, over-adjustment between the adjustment nut 83 and the adjustment bolt 84 is prevented.

Figure 3:
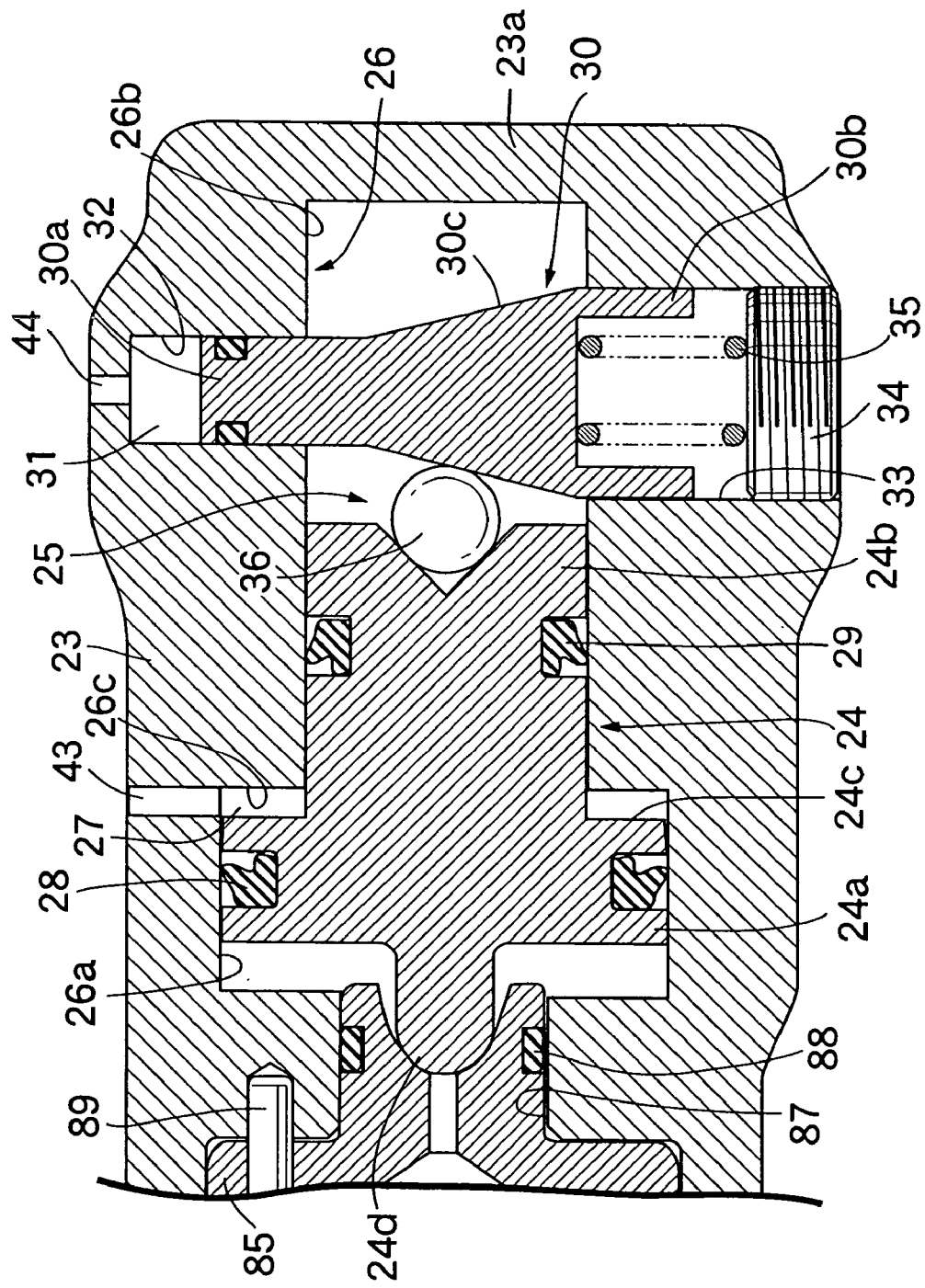
FIG. 3 is an enlarged view of an essential part in FIG. 2 (first embodiment).

Referring in addition to FIG. 3, a casing 23 is connected to the first clamping arm 75a of the brake caliper 75, the casing 23 extending on the opposite side to the brake disk 71, and a parking piston 24 abutting against the relay piston 85 from the rear side is slidably fitted into the casing 23.

The casing 23 forms a slide hole 26 that is coaxial with the cylinder hole 76 of the brake caliper 75, the parking piston 24, which is capable of giving a parking brake state by forward movement in response to a parking control fluid pressure acting on the rear face, is slidably fitted into the slide hole 26 so as to abut against the relay piston 85 from the rear, and a lock mechanism 25 is provided within the casing 23 to the rear side of the parking piston 24, the lock mechanism 25 automatically locking in response to forward movement of the parking piston 24 in order to mechanically lock the parking piston 24 at the forward position and unlocking in response to a parking release control fluid pressure acting thereon.

The slide hole 26 has a front slide hole portion 26a having a larger diameter than that of the relay cylinder hole 87 and being coaxially connected to the rear end of the relay cylinder hole 87, and a rear slide hole portion 26b formed so as to have a smaller diameter than that of the front slide hole portion 26a and being coaxially connected to the rear end of the front slide hole portion 26a, a forward facing annular step portion 26c is formed on an inner face of the casing 23 between the front slide hole portion 26a and the rear slide hole portion 26b, and the rear end of the slide hole portion 26b is closed by a rear end wall 23a of the casing 23.

The parking piston 24 integrally has a large diameter portion 24a and a small diameter portion 24b, the large diameter portion 24a being slidably fitted into the front slide hole portion 101a, and the small diameter portion 24b being connected coaxially to a rear part of the large diameter portion 24a so as to have a rear-facing annular step 24c formed between itself and the large diameter portion 24a and being slidably fitted into the rear slide hole 26b, and a push rod 24d for pushing the relay piston 85 from the rear is integrally and coaxially connected toga central part at the front end of the parking piston 24.

An annular parking control fluid pressure chamber 27 is formed between the casing 23 and the parking piston 24 between the step 24c of the parking piston 24 and the step 26c of the casing 23, the parking control fluid pressure chamber 27 making a parking control fluid pressure act on the parking piston 24 from its rear face side, and annular seals 28 and 29 for sealing the parking control fluid pressure chamber 27 from opposite sides are mounted on outer faces of the large diameter portion 24a and the small diameter portion 24b of the parking piston 24. Moreover, a pressure receiving area of the parking piston 24 facing the parking control fluid pressure chamber 27 is set so as to be larger than a pressure receiving area of the small piston 86 facing the brake fluid pressure chamber 80.

The lock mechanism 25 includes a lock piston 30, which is disposed to the rear of the parking piston 24 so that, when the parking piston 24 moves forward, a forward urging force acts on the parking piston 24.

The lock piston 30 has an axis that is orthogonal to the axis of the parking piston 24, and opposite end parts of the lock piston 30 are slidably supported on the casing 23. That is, the lock piston 30 integrally and coaxially includes a small diameter shaft 30a at one end slidably supported on the casing 23, a large diameter tubular portion 30b at the other end formed so as to have a larger diameter than that of the small diameter shaft portion 30a and slidably supported on the casing 23, and a tapered portion 30c providing a connection between the small diameter shaft portion 30a and the large diameter tubular portion 30b, and the lock piston 30 is disposed to the rear of the parking piston 24 so as to cross the rear slide hole 26b of the slide hole 26.

Provided in the casing 23 is a bottomed cylinder bore 32 that forms a parking release control fluid pressure chamber 31 between itself and the small diameter shaft portion 30a of the lock piston 30, the small diameter shaft portion 30a being slidably fitted into the cylinder bore 32, and mounted on an outer face of the small diameter shaft portion 30a is an annular seal 33 that is in sliding contact with an inner face of the cylinder bore 32.

Furthermore, a support hole 33 that is coaxial with the cylinder bore 32 is provided in the casing 23 so that the large diameter tubular portion 30b is slidably fitted into the support hole 33, and an outer end opening of the support hole 33 is closed by a covering member 34 screwed into the casing 23. Moreover, a spring 35 is provided in a compressed state between the covering member 34 and the lock piston 30 within the support hole 33, and the spring force exhibited by this spring 35 urges the lock piston 30 toward one end in the axial direction, that is, toward the side in which the volume of the parking release control fluid pressure chamber 31 is reduced.

The lock mechanism 25 further includes a spherical body 36 disposed between the tapered portion 30c of the lock piston 30 and the rear end of the small diameter portion 24b of the parking piston 24, and this spherical body 36 is rollably housed in a tapered receiving recess 37 provided in a central part at the rear end of the small diameter portion 24b of the parking piston 24 and rollably contacts the tapered portion 30c.

In accordance with such a lock mechanism 25, since the lock piston 25 is resiliently urged by the spring 35 toward one side in the axial direction, and the tapered portion 30c of the lock piston 30 is connected to the parking piston 24 via the spherical body 36, the spring 35 makes a forward spring urging force act on the parking piston 24 via the tapered portion 30c and the spherical body 36. The spring load of the spring 35 is set so that the forward spring urging force acting on the parking piston 24 is smaller than the spring load of the clutch spring 93 in the adjustment mechanism 82.

The parking control fluid pressure that is made to act on the parking control fluid pressure chamber 27 and the parking release control fluid pressure that is made to act on the parking release control fluid pressure chamber 31 are obtained by controlling, using fluid pressure control means 40A, the fluid pressure discharged from the first pump 10A, which is driven by the electric motor 11 so as to function as a fluid pressure source, this fluid pressure control means 40A including a first normally closed solenoid valve 41 disposed between the inlet valve 6A and a fluid pressure line 43 provided in the casing 23 so as to communicate with the parking control fluid pressure chamber 27, and a second normally closed solenoid valve 42 disposed between the inlet valve 6A and a fluid pressure line 44 provided in the casing 23 so as to communicate with the parking release control fluid pressure chamber 31.

Figure 4:
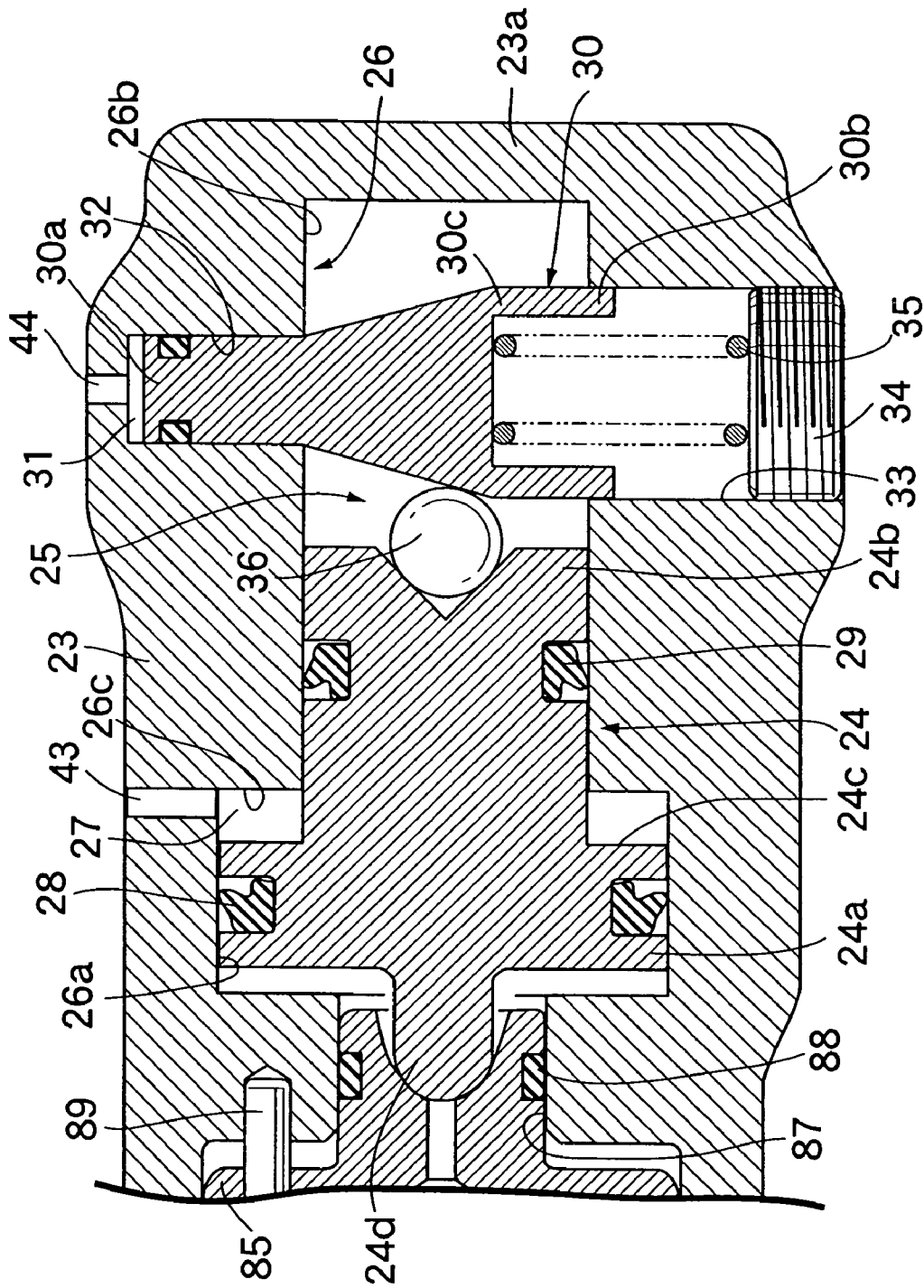
FIG. 4 is a sectional view, corresponding to FIG. 3, in a parking brake state (first embodiment).

When obtaining a parking brake state, the first pump 10A is driven by the electric motor 11, the cut valve 17A is energized and closed, the suction valve 18A is energized and opened and, furthermore, the first normally closed solenoid valve 41 of the fluid pressure control means 40A is energized and opened. Due to this, a brake fluid pressure is made to act on the brake fluid pressure chamber 80 and a parking control fluid pressure is made to act on the parking control fluid pressure chamber 27 and, furthermore, by energizing and opening the second normally closed solenoid valve 42 a fluid pressure is made to act on the parking release control fluid pressure chamber 31, thus making the brake piston 78 and the parking piston 24 move forward while suppressing movement of the lock piston 30 toward one side in the axial direction due to the spring 35. Subsequently, the first solenoid normally closed solenoid valve 41 is de-energized and closed, driving of the first pump 10A by the electric motor 11 is stopped, the cut valve 17A is de-energized and opened, and the suction valve 18A is de-energized and closed. By so doing, the fluid pressure of the parking release control fluid pressure chamber 31 is released and, as shown in FIG. 4, the lock piston 30 moves to one side in the axial direction due to the spring force of the spring 35, and the lock mechanism 25 locks in response to forward movement of the parking piston 24 and movement of the lock piston 30 toward one side in the axial direction. However, when movement of the lock piston 25 toward one side in the axial direction is completed, the first normally closed solenoid valve 41 is temporarily energized and opened, thus releasing residual pressure of the parking control fluid pressure chamber 27.

In this way, when the parking piston 24 is locked by its forward movement, the relay piston 85 is moved forward by the push rod 24*d* provided at the front end of the parking piston 24, the movement of the relay piston 85 allows the brake piston 78 to move forward via the movable clutch body 92, the adjustment bolt 84, and the adjustment nut 83, and in the same manner as for normal braking, by pressing the linings 72*a* and 73*a* of the first and second friction pads 72 and 73 against opposite sides of the brake disk 71 so as to generate a braking force, a parking brake state can be obtained.

During the process of obtaining this parking brake state, since the relay piston 85 and the movable clutch body 92 are frictionally engaged by the pressing force of the parking piston 24 so that they cannot rotate relative to each other, relative rotation between the adjustment bolt 84 and the adjustment nut 83 is restricted. Therefore, when the front left wheel brake 2A functions as a parking brake, the above-mentioned automatic adjustment by the adjustment mechanism 82 is not carried out.

Furthermore, when obtaining a parking brake state during normal braking operation, if a value detected by a pressure sensor 15A is sufficiently high, the fluid pressure control means 40A may be operated in a state in which the cut valve 17A is de-energized and opened, and the suction valve 18A is de-energized and closed, employing the master cylinder M as a fluid pressure source rather than driving the first pump 10A by the electric motor 11; furthermore, if a value detected by the pressure sensor 15A is low, the cut valve 17A may be energized and closed, the suction valve 18A may be energized and opened, and the fluid pressure control means 40A may be operated while driving of the first pump 10A by the electric motor 11 is carried out. Regardless of the value detected by the pressure sensor 15A, the cut valve 17A may be energized and closed, the suction valve 18A may be energized and opened, and the fluid pressure control means 40A may be operated while driving of the first pump 10A by the electric motor 11 is carried out.

The front right wheel brake 2C has the same arrangement as that of the front left wheel brake 2A; when obtaining a parking brake state for the front right wheel brake 2C, the second pump 10B is made to function as a fluid pressure source by operating the electric motor 11 in a state in which the suction valve 18B is energized and opened and the cut valve 17B is energized and closed, and the operation of fluid pressure control means 40B may be controlled.

The operation of the first embodiment is now explained. When a parking control fluid pressure is made to act on the rear face of the parking piston 24, the parking piston 24 moves forward and the lock mechanism 25 mechanically locks the forward position of the parking piston 24, thus automatically giving a parking brake state, when the parking brake state is released, a parking release control fluid pressure may be made to act on the lock mechanism 25, and a parking brake state can automatically be obtained by a simple structure without consuming power in the parking brake state.

Moreover, the lock mechanism 25 is disposed to the rear of the parking piston 24 so that, when the parking piston 24 moves forward, a forward urging force acts on the parking piston 24, the lock mechanism 25 including the lock piston 30, whose opposite end parts are slidably supported on the casing 23, and the lock piston 30 can be supported at two points by the casing 23 so that the reaction force acting on the lock piston 30 when the parking piston 24 is locked in the forwardly moved state is distributed between axially opposite ends of the lock piston 30.

Therefore, the casing 23 can be made light by avoiding any increase in thickness in order to increase the strength of a portion of the casing 23 that supports the lock piston 30 and, furthermore, the axial length of the casing 23 can be reduced by making the axial length of a portion of the casing 23 that houses the lock piston 30 relatively short.

Embodiment 2

FIG. 5 to FIG. 13 show a second embodiment of the present invention.

Figure 5:
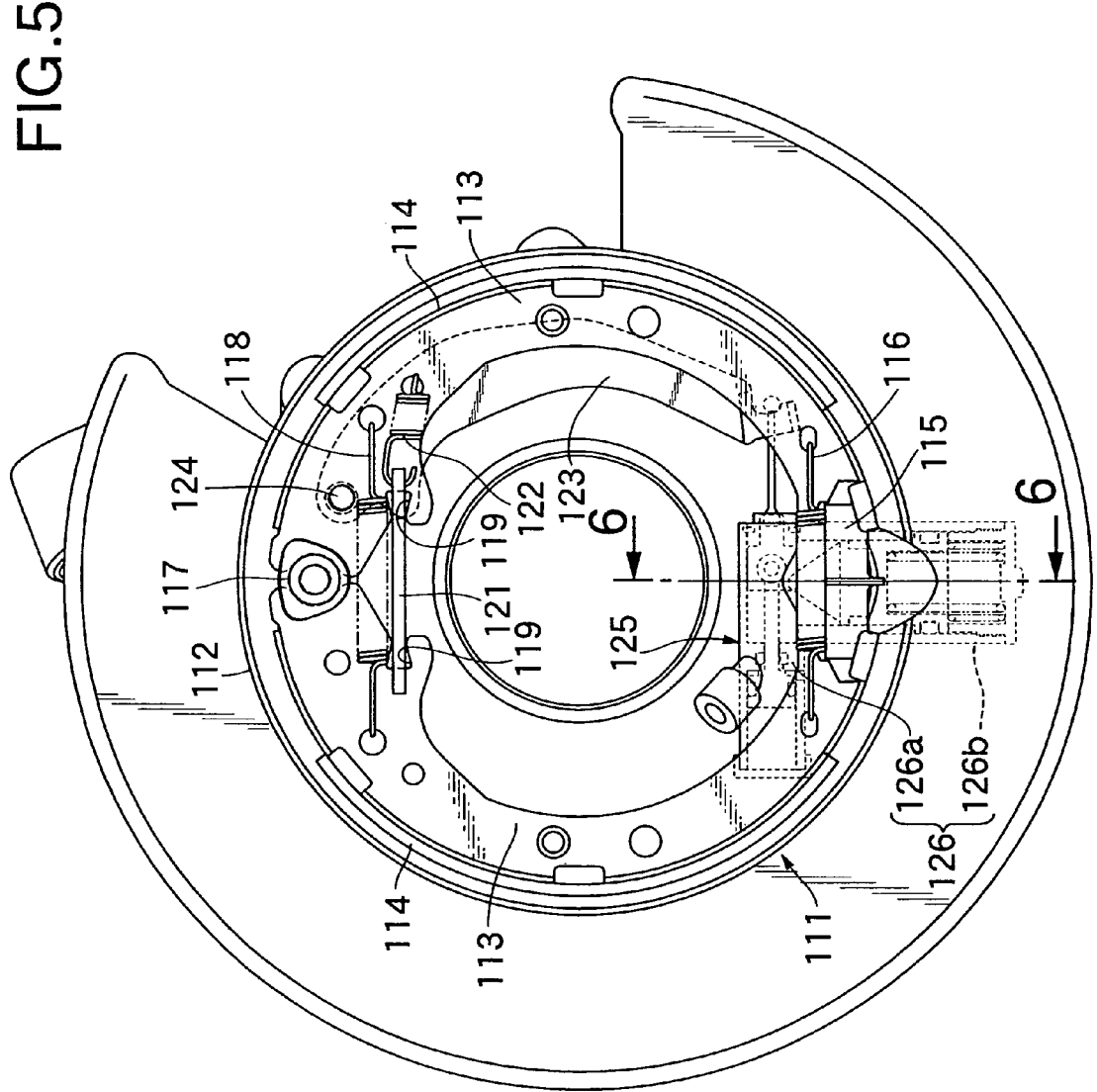
FIG. 5 is a front view of a drum brake (second embodiment).

Referring first to FIG. 5, a back plate 112 of a drum brake 111 as a brake mechanism exclusively used for a parking brake is fixedly mounted on a vehicle body side so as to cover an open end of a brake drum (not illustrated). One end of each of a pair of brake shoes 113 and 113 disposed within the brake drum so as to have linings 114 and 114 that can come into sliding contact with the brake drum is swingably supported at respective opposite ends of an extendable strut 115, and a spring 116 is provided in a compressed state between said ends of the two brake shoes 113, the spring 116 urging the two brake shoes 113 toward the opposite end sides of the strut 115. The other end of each of the two brake shoes 113 is supported by an anchor 117 provided on the back plate 112 so that said other end can be separated from the anchor 117 and is urged by a return spring 118 in a direction in which it is supported by the anchor 117. Opposing faces of said other ends of the two brake shoes 113 are provided with notches 119, opposite ends of a strut 121 engage with these notches 119, and a spring 122 is provided in a compressed state between one end of the strut 121 and one of the brake shoes 113.

A parking operation lever 123 is disposed between said one brake shoe 113 and the back plate 112 so that part of the parking operation lever 123 is superimposed on said one brake shoe 113, and parking drive means 125 is connected to one end of the operation lever 123. The other end part of the parking operation lever 123 engages with one end of the strut 121 and is swingably connected to the other end part of said one brake shoe 113 via a pivot shaft 124.

If the parking operation lever 123 is pivoted around the pivot shaft 124 in a clockwise direction in FIG. 5 by the parking drive means 125 the other brake shoe 113 is pressed against the inner periphery of the brake drum via the strut 121, and the reaction allows said one brake shoe 113 to also be pressed against the inner periphery of the brake drum, thus enabling a parking brake state to be obtained by means of the drum brake 111.

Figure 6:
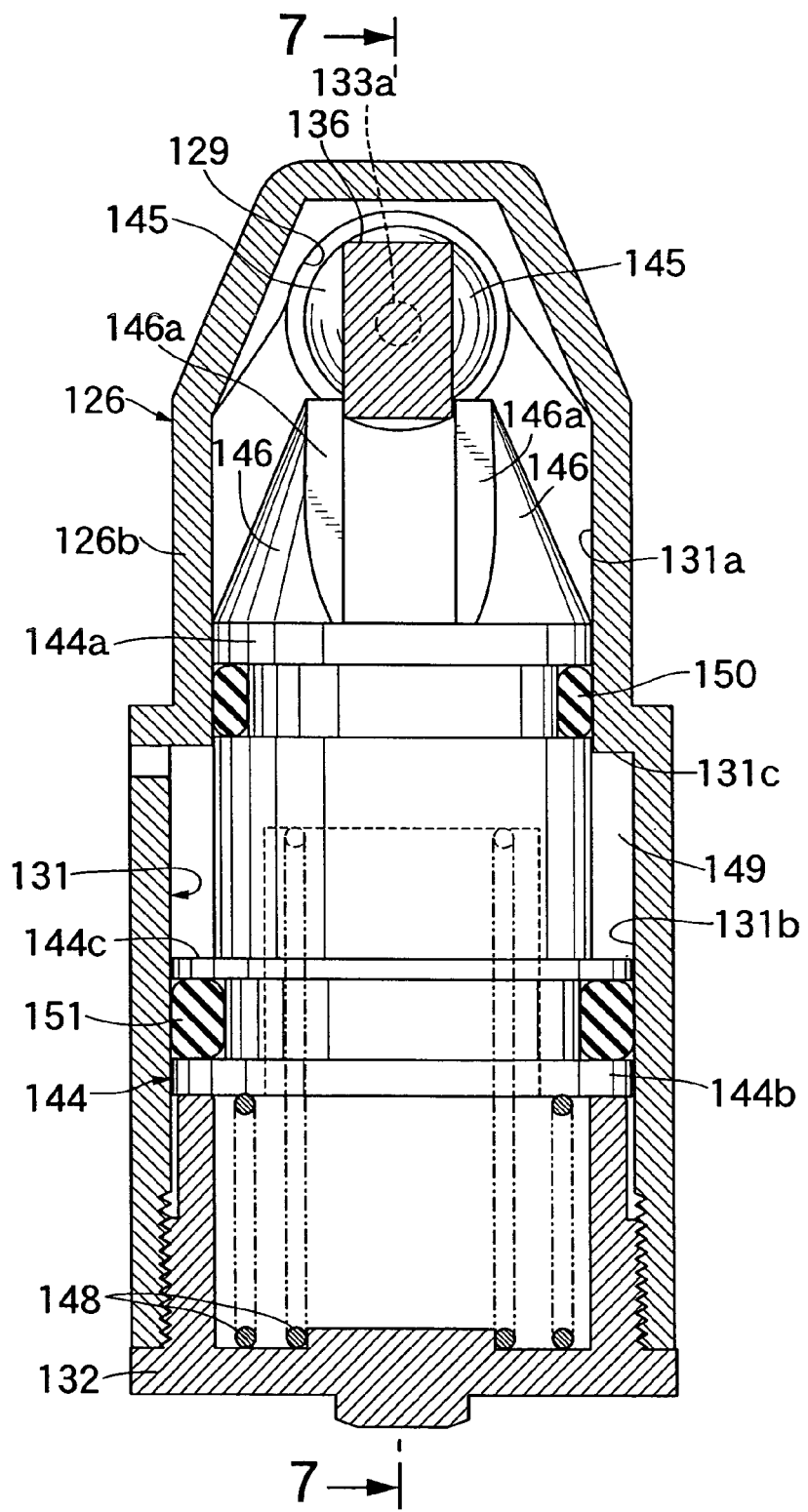
FIG. 6 is an enlarged sectional view along line 6-6 in FIG. 5 (second embodiment).
Figure 7:
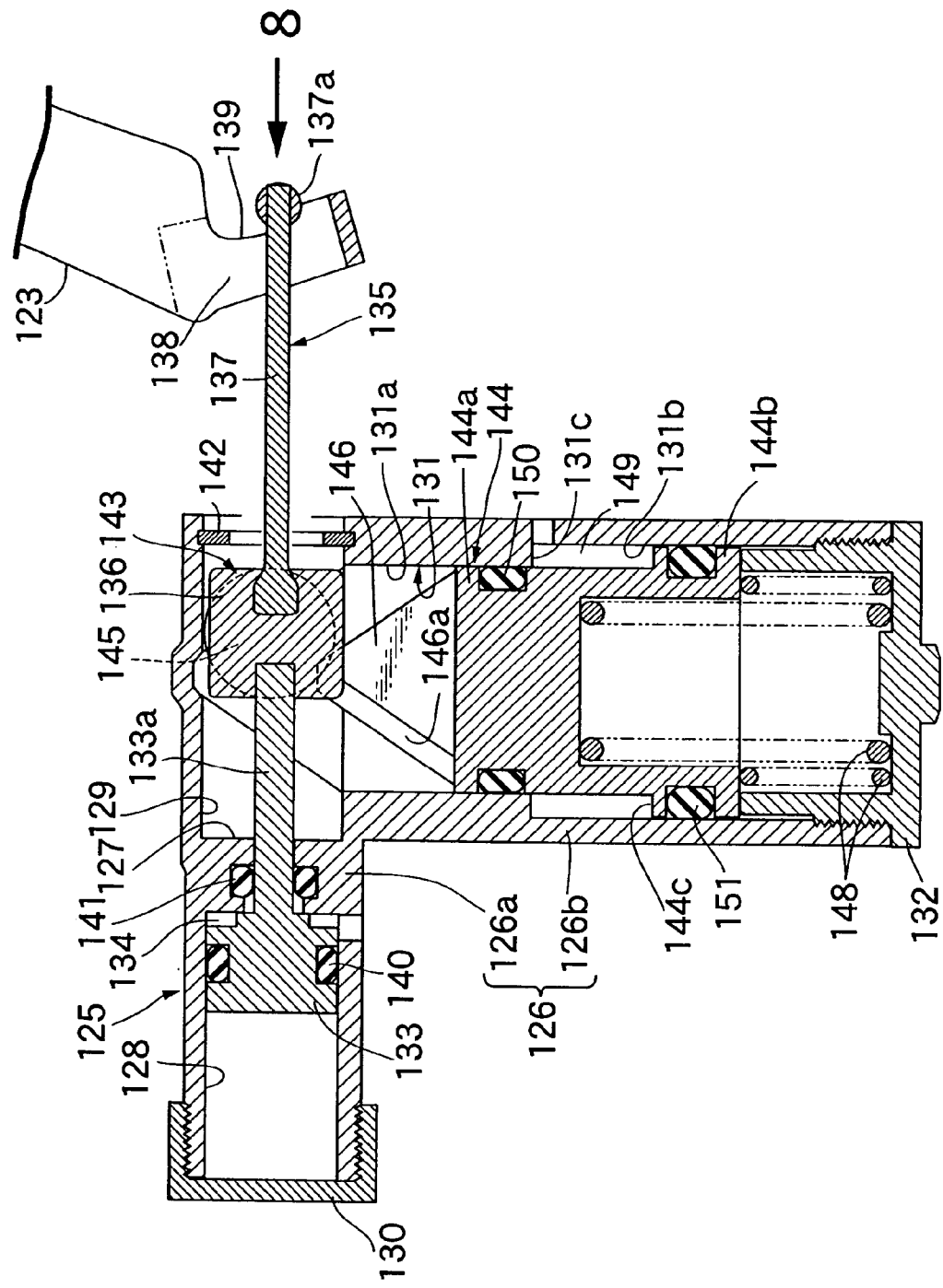
FIG. 7 is a sectional view along line 7-7 in FIG. 6 (second embodiment).

Referring to FIG. 6 and FIG. 7 in combination, the parking drive means 125 includes a casing 126 fixed to the back plate 112 at said one end of the two brake shoes 113. The casing 126 includes a first tubular portion 126a extending in parallel to the strut 115 and the spring 116, and a second tubular portion 126b extending in a direction orthogonal to the first tubular portion 126a and connected integrally to a middle section of the first tubular portion 126a, the first tubular portion 126a being disposed on the inner face side of the back plate 112, and the second tubular portion 126b running through the back plate 112 and extending outward.

A dividing wall 127 is provided integrally with an axially middle section of the first tubular portion 126a, which has opposite ends open, a first slide hole 128 is provided in the first tubular portion 126a on the front side (left side in FIG. 7) relative to the dividing wall 127, a housing hole 129 is provided within the first tubular portion 126a on the rear side (right side in FIG. 7) relative to the dividing wall 127, the housing hole 129 being coaxial with the first slide hole 128, and a covering member 130 is screwed onto the first tubular portion 126a so as to close the front end of the first slide hole 128.

Furthermore, a second slide hole 131 is provided in the second tubular portion 126b, the second slide hole 131 being connected to the housing hole 129 at a right angle and being formed by coaxially connecting a small diameter hole portion 131a having one end connected to the housing hole 129 and a large diameter hole portion 131b having a larger diameter than that of the small diameter hole portion 131a and having one end connected coaxially to the other end of the small diameter hole 131a, an annular step portion 131c is formed between the small diameter hole portion 131a and the large diameter hole portion 131b, the annular step portion 131c facing the side opposite to the housing hole 129, and a covering member 132 is screwed into the outer end of the second tubular portion 126b, the covering member 132 closing the other end of the large diameter hole portion 131b.

Slidably fitted into the first slide hole 128 of the casing 126 is a parking piston 133 that enables a parking brake state to be obtained by forward movement in response to a parking control fluid pressure acting on the rear face side, and mounted around the outer periphery of the parking piston 133 is an annular seal 140. A parking control fluid pressure chamber 134 is formed within the first tubular portion 126a of the casing 126 between the rear face of the parking piston 133 and the dividing wall 127, the parking control fluid pressure chamber 134 enabling a parking control fluid pressure to act.

The parking piston 133 is connected to said one end part of the parking operation lever 123 of the drum brake 111 via coupling means 135, a traction acting on the coupling means 135 in response to forward movement of the parking piston 133 is inputted into the parking operation lever 123, and the parking operation lever 123 thereby pivots toward the side that makes the drum brake 111 operate for parking.

The coupling means 135 is formed from a rod 133a, a stopper 136, and a coupling rod 137, the rod 133a hermetically and slidably running through the dividing wall 127 via an annular seal 141 and being coaxially and integrally connected to a central section at the rear end of the parking piston 133, the stopper 136 being connected to the rod 133a and slidably housed within the housing hole 129, and the coupling rod 137 providing a connection between the stopper 136 and the parking operation lever 123, and a retaining ring 142 is mounted on an end part of the housing hole 129 on the side opposite to the dividing wall 127, the retaining ring 142 preventing the stopper 136 from falling out of the housing hole 129.

Figure 8:
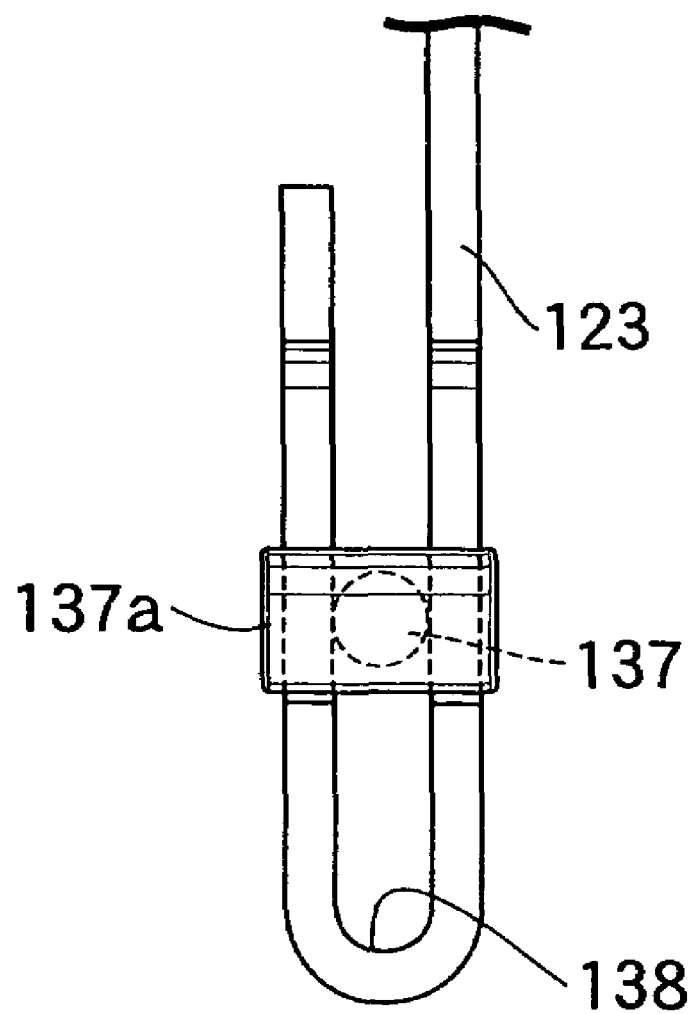
FIG. 8 is a view from arrow 8 in FIG. 7 (second embodiment).

Referring in addition to FIG. 8, said one end part of the parking operation lever 123 is bent into a substantially U-shaped form so as to form a slit 138, and an enlarged engagement portion 137a is provided at an end part of the coupling rod 137, which is inserted through the slit 138, the enlarged engagement portion 137a abutting against and engaging with said one end part of the parking operation lever 123. Moreover, an abutment face 139 provided on the parking operation lever 123 so that the enlarged engagement portion 137a abuts thereagainst and engages therewith has an arc shape and is formed so that not only does the tangent of the abutment face 139 at a point in contact with the enlarged engagement portion 137a when the traction acting on the parking operation lever 123 becomes a maximum accompanying forward movement of the parking piston 133 form a right angle with respect to the direction in which the traction acts on the parking operation lever 123 from the coupling rod 1137, but also the above-mentioned tangent at the point in contact with the enlarged engagement portion 137a over the entire stroke region of the coupling rod 137 forms a right angle with respect to the direction in which the traction acts.

Moreover, the outer face shape of at least a portion of the enlarged engagement portion 137a that is in contact with the abutment face 139 is formed in a curved shape protruding toward the abutment face 139.

Furthermore, a lock mechanism 143 is provided within the casing 126, the lock mechanism 143 automatically locking in response to forward movement of the parking piston 133 in order to mechanically lock the parking piston 133 in the forward position and unlocking in response to the action of a parking release control fluid pressure.

This lock mechanism 143 includes a lock piston 144, a retaining part 145, and a pair of locking parts 146 and 146, the lock piston 144 being slidably fitted into the casing 126 so as to have an axis that is orthogonal to the axis of the parking piston 133 so that when the parking piston 133 moves forward an urging force toward one side in the axial direction acts on the lock piston 144 and being arranged such that a parking release control pressure can act on the lock piston 144 toward the other side in the axial direction, the retaining part 145 being provided on the stopper 136, which is a middle member of the coupling means 135 providing a connection between the parking piston 133 and the parking operation lever 123, and the locking parts 146 and 146 being provided at one end, in the axial direction, of the lock piston 144 in order to mechanically lock the forward position of the parking piston 133 by abutting against and engaging with the retaining part 145 from the rear.

Figure 9:
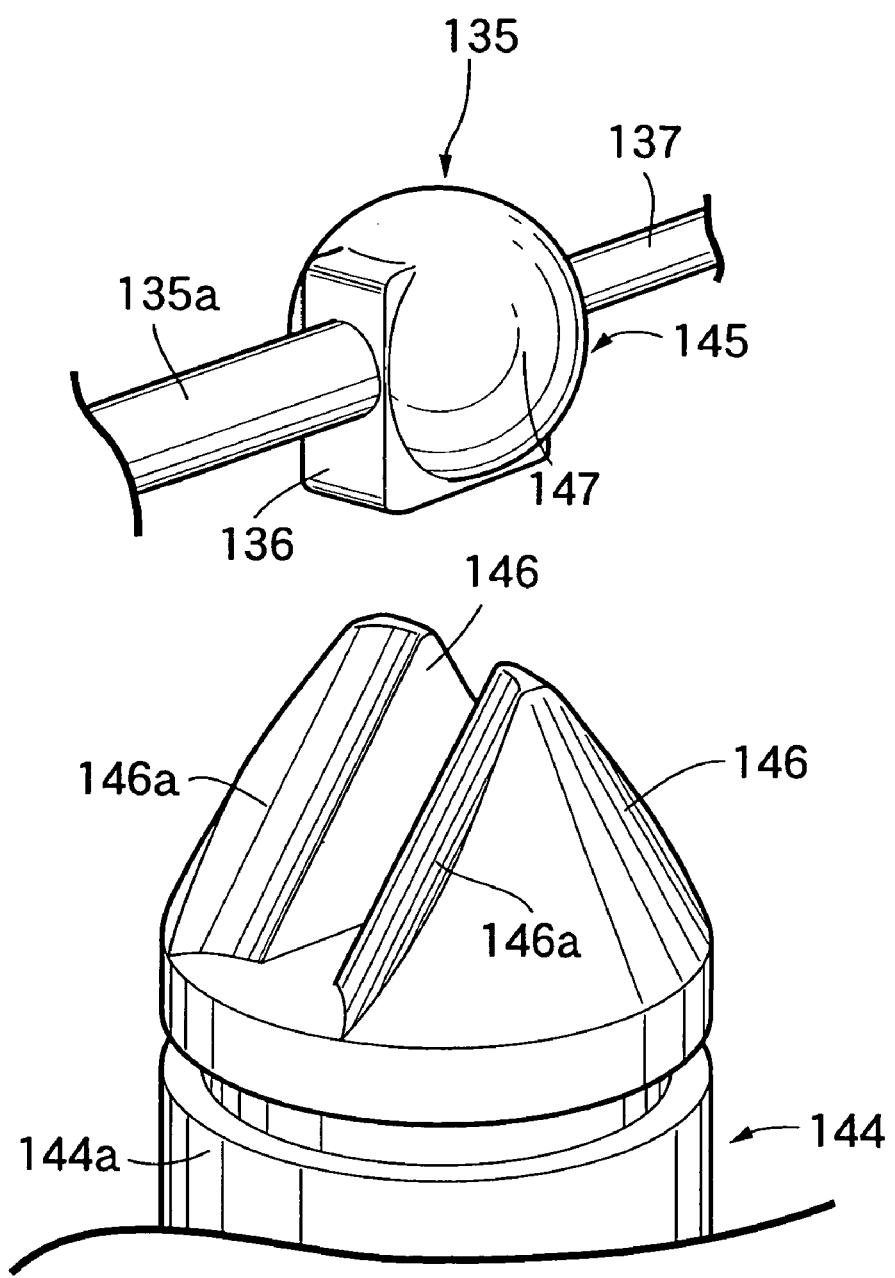
FIG. 9 is a perspective view of a stopper and a lock piston (second embodiment).

Referring in addition to FIG. 9, the stopper 136 is formed so as to have a substantially rectangular cross section in which the thickness in a direction orthogonal to-the axes of the second slide hole 131 and the housing hole 129 is small, the stopper 136 is provided integrally with the spherical retaining part 145 so that it projects from the stopper 136 on opposite sides, and a portion of the retaining part 145 is in sliding contact with an inner face of the housing hole 129 on the side opposite to the lock piston 144.

The lock piston 144 is slidably fitted into the second slide hole 131, which is positioned to the rear of the parking piston 133, and is formed integrally from a small diameter portion 144a and a large diameter portion 144b, the small diameter portion 144a being slidably fitted into the small diameter hole portion 131a of the second slide hole 131, and the large diameter portion 144b being connected coaxially to the small diameter portion 144a so as to form between itself and a rear part of the small diameter portion 144a an annular step portion 144c facing the step portion 131c of the second slide hole 131, and being slidably fitted into the large diameter hole portion 131b of the second slide hole 131.

A pair of springs 148 and 148 which, for example, are arranged side by side, are provided in a compressed state between the lock piston 144 and the covering member 132 in order to spring-bias the lock piston 144 toward one side in the axial direction, that is, toward the stopper 136 side. An annular parking release control fluid pressure chamber 149 is formed between the step portion 144c of the lock piston 144 and the step portion 131c of the second slide hole 131 between the lock piston 144 and the casing 126, a parking release control fluid pressure for urging the lock piston 144 toward the other side in the axial direction being applied to the parking release control fluid pressure chamber 149, and the pressure-receiving area of the lock piston 144 facing the parking release control fluid pressure chamber 149 is set to be larger than the pressure-receiving area of the parking piston 133 facing the parking control fluid pressure chamber 1134.

Furthermore, annular seals 150 and 151 are fitted around the outer periphery of the small diameter portion 144a and the outer periphery of the large diameter portion 144b of the lock piston 144, the annular seals 150 and 151 sealing the parking release control fluid pressure chamber 149 from axially opposite sides and being in sliding contact with the small diameter hole portion 131a and the large diameter hole portion 131b of the second slide hole 131.

The pair of locking parts 146 and 146 are connected to the small diameter portion 144a at one end of the lock piston 144 so as to straddle the stopper 136, which is disposed in the middle section of the coupling means 135, when the parking piston 133 is in the forward position and, moreover, the outer peripheral faces of the locking parts 146 are formed in a tapered shape in which the extremity side is narrowed so that they can be inserted into the housing hole 129, which has a smaller diameter than that of the small diameter hole portion 131a of the second slide hole 131.

Furthermore, engagement faces 146a are formed on the locking parts 146, the engagement faces 146a being capable of abutting against and engaging with the retaining part 145 from the rear, and these engagement faces 146a are formed so as to be recessed in an arc shape while being inclined so that, in going toward one side in the axial direction of the lock piston 144, they are positioned to the rear in the axial direction of the parking piston 133 in order to mechanically lock the forward operating position of the parking piston by abutting against and engaging with the retaining part 145 from the rear.

Figure 10:
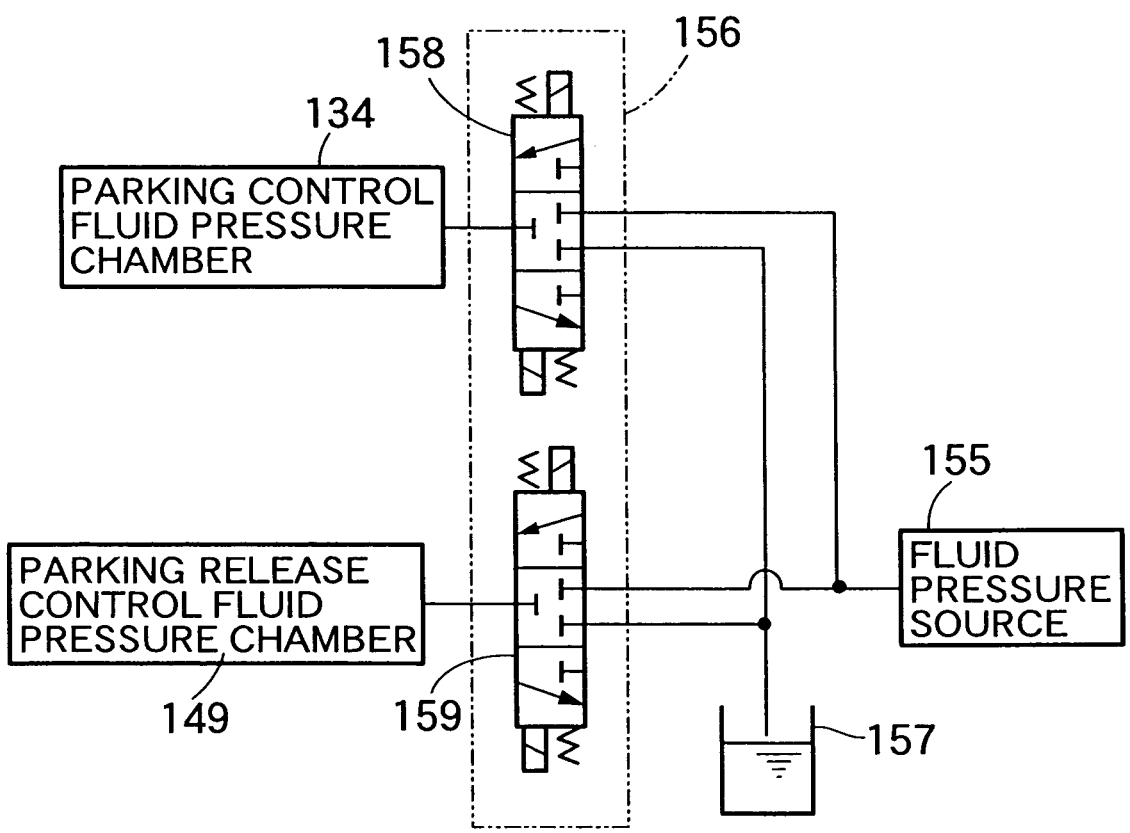
FIG. 10 is a diagram showing the arrangement of a fluid pressure circuit (second embodiment).

In FIG. 10, a parking control fluid pressure acting on the parking control fluid pressure chamber 134 and a parking release control fluid pressure acting on the parking release control fluid pressure chamber 149 are obtained by controlling, using fluid pressure control means 156, the fluid pressure generated by a fluid pressure source 155, and this fluid pressure control means 156 is formed from a first control valve 158 capable of switching between a state in which the parking control fluid pressure chamber 134 communicates selectively with the fluid pressure source 155 or a reservoir 157 and a state in which the fluid pressure of the parking control fluid pressure chamber 134 is locked, and a second control valve 159 capable of switching between a state in which the parking release control fluid pressure chamber 149 communicates selectively with the fluid pressure source 155 or the reservoir 157 and a state in which the fluid pressure of the parking release control fluid pressure chamber 149 is locked.

When obtaining a parking brake state, making a parking control fluid pressure act on the parking control fluid pressure chamber 134 and a fluid pressure act on the parking release control fluid pressure chamber 149 allows the parking piston 133 to move forward while preventing the lock piston 144 from moving axially in one direction. Subsequently, when the fluid pressure of the parking release control fluid pressure chamber 149 is released, the lock piston 144 moves axially in one direction due to the spring force of the springs 148, and the lock mechanism 143 locks in response to forward movement of the parking piston 133 and the lock piston 144.

Figure 11:
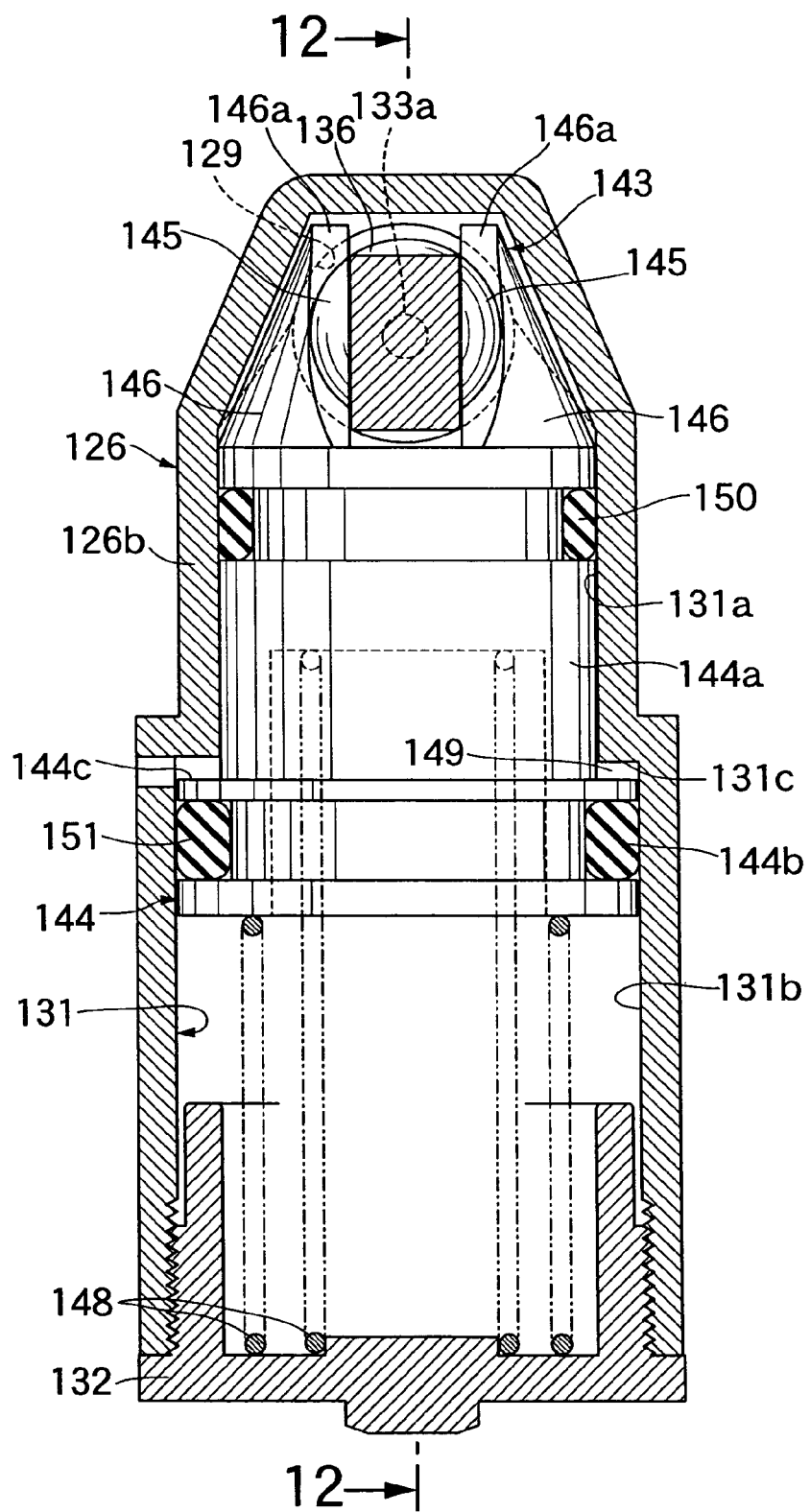
FIG. 11 is a sectional view, corresponding to FIG. 6, in a parking brake state (second embodiment).
Figure 12:
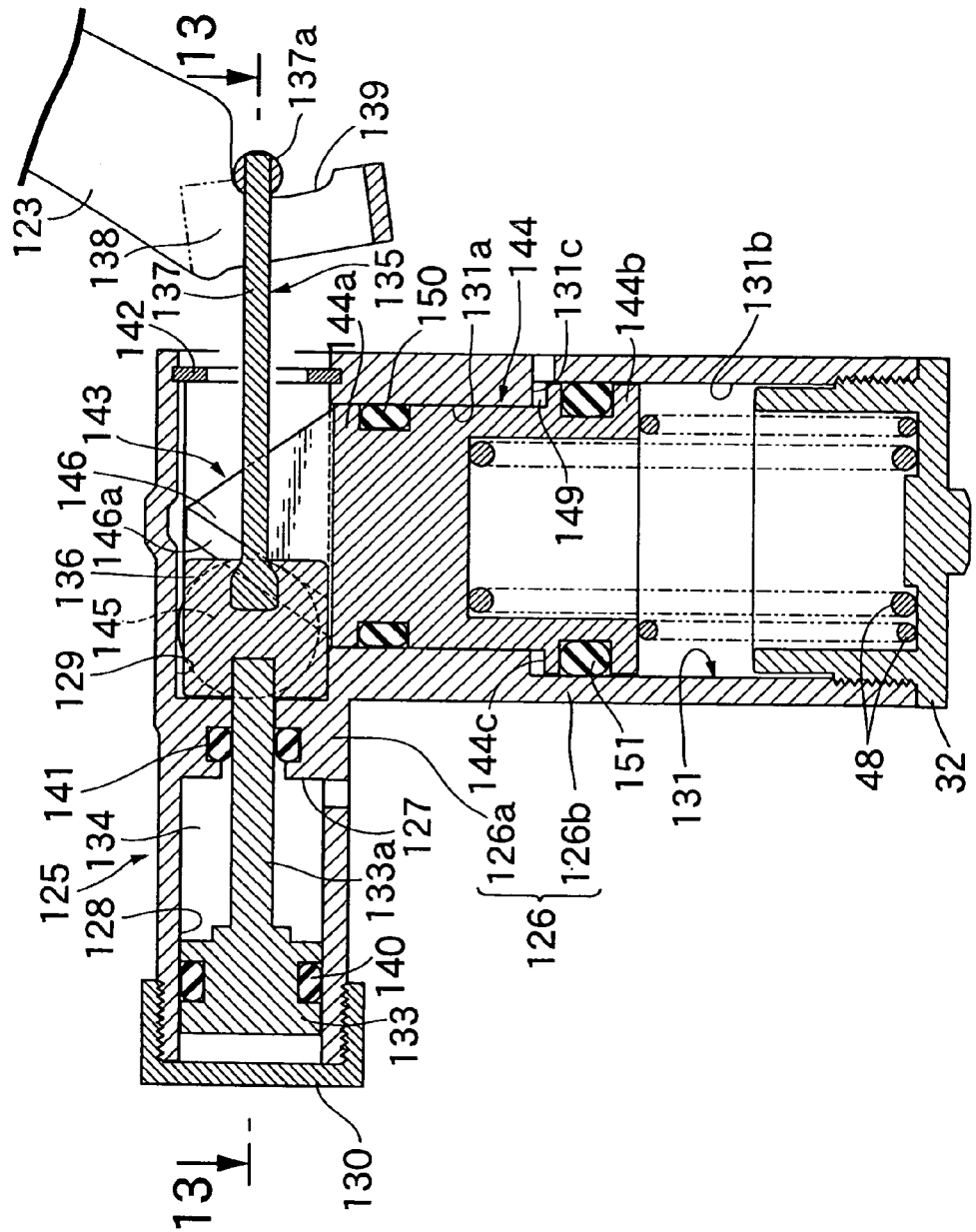
FIG. 12 is a sectional view along line 12-12 in FIG. 11 (second embodiment).
Figure 13:
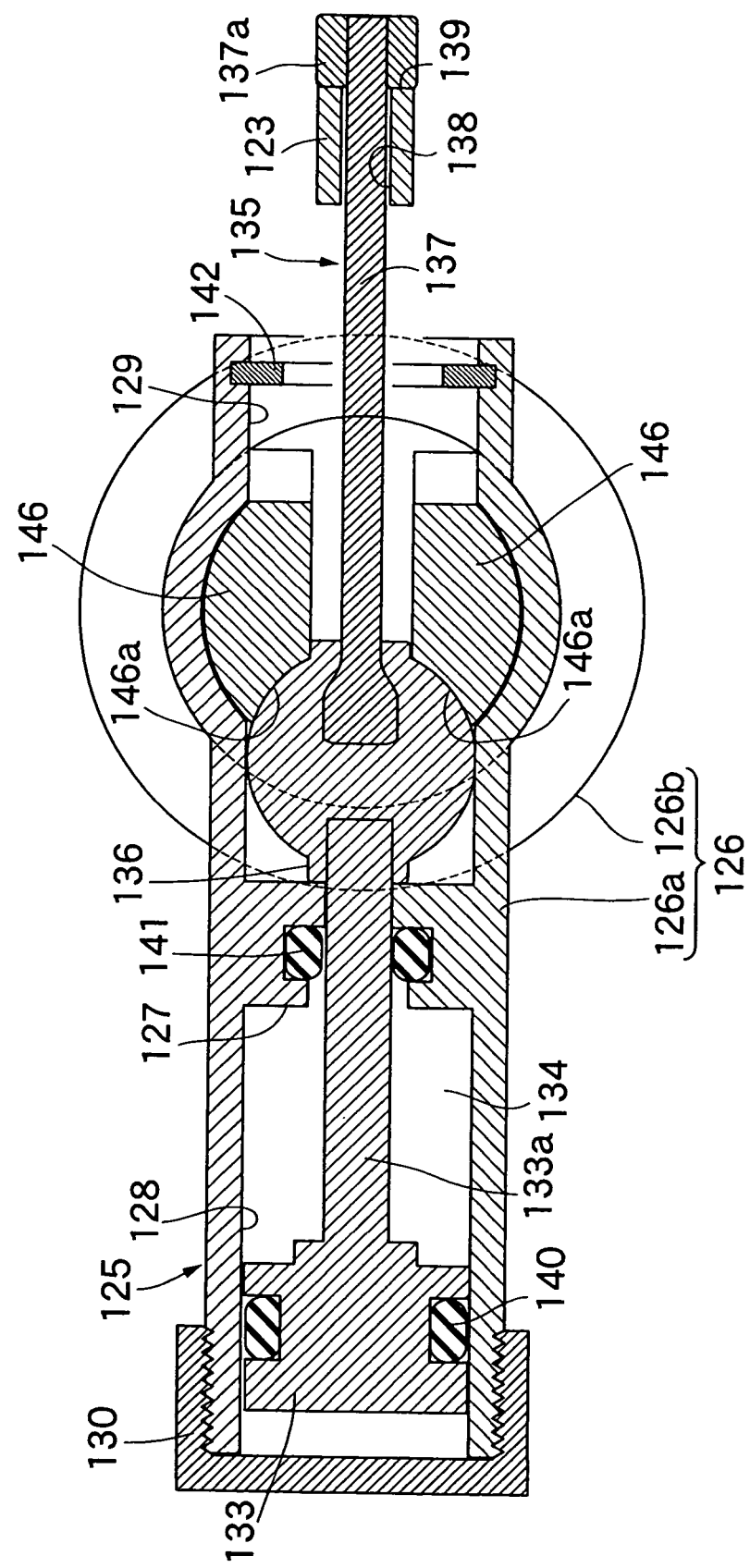
FIG. 13 is a sectional view along line 13-1139 in FIG. 12 (second embodiment).

That is, as shown in FIG. 11 to FIG. 13, the engagement faces 146a formed on the locking parts 146 at one end of the lock piston 144 abut against and engage with, from the rear, retaining faces 145a of the retaining parts 145 provided on the stopper 136, which has moved forward together with the parking piston 133, thus mechanically locking the forwardly moved state of the parking piston 133. In addition, residual pressure of the parking control fluid pressure chamber 134 is released when movement of the lock piston 144 toward one side in the axial direction is completed.

In this way, when the parking piston 133 moves forward, the drum brake 111 is operated for parking due to pivoting of the parking operation lever 123, and the forwardly moved state of the parking piston 133 is locked, thereby maintaining the parking brake state. Moreover, since the force for operating the two brake shoes 113 in the drum brake 111 as a parking brake is transmitted to the two brake shoes 113 via the parking operation lever 123, the fluid pressure that has to be exhibited by the parking drive means 125 is relatively small owing to the lever ratio of the parking operation lever 123.

When the parking brake state is released, the fluid pressure of the parking control fluid pressure chamber 134 and the fluid pressure of the parking release control fluid pressure chamber 149 are increased at the same time; during the process of increasing the pressure, a fluid pressure that is greater than the spring force of the springs 148 acts first on the lock piston 144, as a result the lock piston 144 moves toward the other side in the axial direction, the locked state of the lock mechanism 143 is thereby released, and the parking piston 133 is made to retreat by the fluid pressure of the parking control fluid pressure chamber 134. The parking release control fluid pressure chamber 149 is maintained in a fluid pressure locked state while the lock mechanism 143 is unlocked, and the locking parts 146 of the lock piston 144 move to a position at which they avoid abutment with the retaining parts 145 of the stopper 136 while being in contact with opposite sides of the stopper 136, thereby restricting rotation of the lock piston 144 around the axis.

The operation of this second embodiment is now explained. When the drum brake 111 is made to operate as a parking brake, a parking control fluid pressure may be made to act on the parking control fluid pressure chamber 134, which the rear side of the parking piston 133 of the parking drive means 125 faces, the parking piston 133 is moved forward, the drum brake 111 is operated for braking, and a parking brake state can thus be obtained; moreover, since the parking operation state due to forward movement of the parking piston 133 is mechanically locked by the lock mechanism 143, a parking brake state can be obtained automatically. Furthermore, when the parking brake state is released, a parking release control fluid pressure may be made to act on the lock mechanism 143, and a parking brake state can be obtained automatically by a simple structure without consuming power in the parking brake state.

The lock mechanism 143 includes the lock piston 144, which is slidably fitted into the casing 126 so as to have an axis that is orthogonal to the axis of the parking piston 133 so that when the parking piston 133 moves forward an urging force toward one side in the axial direction acts on the lock piston 144 and which enables a parking release control pressure to act on the lock piston 144 toward the other side in the axial direction, the retaining part 145, which is provided on the stopper 136 connected to the parking piston 133, and the locking parts 146, which are provided at one end, in the axial direction, of the lock piston 144 and which have the engagement faces 146a that mechanically lock the forward position of the parking piston 133 by engaging with the retaining part 145 from the rear, the engagement faces 146a being inclined so that, in going toward one side in the axial direction of the lock piston 144, they are positioned to the rear in the axial direction of the parking piston 133.

It is therefore possible to mechanically lock the forward position of the parking piston 133 in accordance with a change in the amount of forward movement of the parking piston 133 from a retreat limit in the parking brake state, a change in the stroke of the parking piston 133 according to dimensional tolerance, assembly error, or wear of the linings 114 of the brake shoes 113 can be dealt with, and when releasing the lock, the lock piston 144 can be moved effortlessly toward the other side in the axial direction from the locked state.

Furthermore, since the retaining part 145 provided on the stopper 136 is formed in a spherical shape, and the engagement faces 146a formed on the locking parts 146 of the lock piston 144 in order to mechanically lock the forward position of the parking piston 133 by abutting against and engaging with the retaining part 145 from the rear are recessed in an arc shape, the contact area between the retaining faces 145a and the engagement faces 146a when the parking piston 133 is in the forwardly moved state can be made relatively large, and it is possible to suppress wear, buckling, etc. due to the load applied to the abutment and engagement parts of the stopper 136 and the lock piston 144 from the parking piston 133 side, thereby improving the durability.

Moreover, since the stopper 136, on which the retaining part 145 is provided, is disposed in a middle section of the coupling means 135, which provides a connection between the parking piston 133 and the parking operation lever 123, and the locking parts 146 and 146 are provided at one end of the lock piston 144 so as to straddle the stopper 136, the arrangement is such that the forward movement force of the parking piston 133 is transmitted to the parking operation lever 123 of the drum brake 111 via the coupling means 135, and at the same time the lock mechanism 143 can be made compact and simple.

Furthermore, the enlarged engagement portion 1137a provided on the end part of the coupling rod 137, which is a part of the coupling means 135, abuts against and engages with said one end of the parking operation lever 123, and the arc-shaped abutment face 139 provided on the parking operation lever 123 so as to abut against and engage with the enlarged engagement portion 137a is formed so that not only does the tangent of the abutment face 139 at the point in contact with the enlarged engagement portion 137a when the traction acting on the parking operation lever 123 becomes a maximum accompanying forward movement of the parking piston 133 form a right angle with respect to the direction in which the traction acts on the parking operation lever 123 from the coupling rod 137, but also the above-mentioned tangent at the point in contact with the enlarged engagement portion 1137a over the entire stroke region of the coupling rod 137 forms a right angle with respect to the direction in which the traction acts.

Therefore, when the traction acting on the parking operation lever 123 becomes a maximum, not only is it possible to prevent galling between the coupling rod 137 and the parking operation lever 123, thus improving the durability, but it is also possible to prevent galling between the coupling rod 137 and the parking operation lever 123 over the entire stroke region of the coupling rod 137, thereby further improving the durability.

Furthermore, since the outer face shape of at least the portion of the enlarged engagement portion 137a that is in contact with the abutment face 139 is formed in a curved shape that protrudes toward the abutment face 139, it is possible to prevent galling between the coupling rod 137 and the parking operation lever 123 more effectively, and it is also possible to alleviate stress by making the contact area between the parking operation lever 123 and the enlarged engagement part 137a relatively large.

Moreover, since the coupling rod 137 can be engaged with and coupled to the parking operation lever 123 by inserting the coupling rod 137 through the slit 138 provided in the parking operation lever 123, the ease of assembly is excellent.

Although embodiments of the present invention are explained above, the present invention is not limited to the above-mentioned embodiments and may be modified in a variety of ways as long as the modifications do not depart from the present invention described in Claims.

The invention claimed is:

1. A parking brake system comprising:
   a casing having a hollow bore formed therein to accommodate a parking piston;
   a parking piston slidably fitted into the casing so that a parking brake activation state can be achieved by forward movement of said parking piston in response to a parking control fluid pressure acting on a rear face side of the parking piston;
   a lock mechanism provided within the casing to the rear side of the parking piston, said lock mechanism configured and arranged so as to automatically lock in response to forward movement of the parking piston in order to mechanically lock the parking piston at a forward position and unlock in response to a parking release control fluid pressure acting on the lock mechanism;
   a fluid pressure source and
   a fluid pressure control mechanism for controlling a fluid pressure generated by the fluid pressure source so that the parking control fluid pressure and the parking release control fluid pressure can be obtained;
   the lock mechanism comprising a hydraulically actuatable lock piston that is disposed to the rear of the parking piston while having an axis orthogonal to the axis of the parking piston and that makes a forward urging force act on the parking piston when the parking piston moves forward, and opposite end parts of the lock piston being slidably fitted into and supported on the casing.

2. The parking brake system of claim 1, wherein the lock piston comprises a first small diameter portion, a second large diameter portion at the end opposite the first small portion and a tapered portion connecting the first and second diameter portions.

3. The parking brake system of claim 1, wherein the lock mechanism includes a spherical body rollably housed in the casing between the lock piston and the parking piston.

4. The parking brake system of claim 1, wherein the parking piston smaller diameter second end includes a tapered receiving recess for accommodating the spherical body.

5. A parking brake system comprising:
a casing having a hollow bore formed therein to accommodate a parking piston;
a parking piston slidably fitted into the casing so that a parking brake brake activation state can be achieved by forward movement of said parking piston in response to a parking control fluid pressure acting on a rear face side of the parking piston;
a lock mechanism provided within the casing, said lock mechanism configured and arranged so as to automatically lock in response to forward movement of the parking piston in order to mechanically lock the parking piston at a forward position and unlock in response to a parking release control fluid pressure acting on the lock mechanism;
a fluid pressure source; and
a fluid pressure control device for controlling a fluid pressure generated by the fluid pressure source so that the parking control fluid pressure and the parking release control fluid pressure can be obtained;
the lock mechanism comprising a lock piston that is slidably fitted into the casing with its rotational position restricted while having an axis that is orthogonal to the axis of the parking piston so that at least when the parking piston moves forward an urging force toward one side in the axial direction acts on the lock piston and that is arranged such that a parking release control pressure can act on the lock piston toward the other side in the axial direction,
a spherical retaining part that is provided on the parking piston or a stopper coupled to the parking piston,
and a locking part that is provided at one end, in the axial direction, of the lock piston while having an engagement face that is recessed in an arc shape in order to mechanically lock the forward operating position of the parking piston by abutting against and engaging with the retaining part from the rear,
and that is inclined so as to be positioned to the rear in the axial direction of the parking piston, in going toward one side in the axial direction of the lock piston.

6. The parking brake system of claim 5, wherein the stopper is integral with the spherical retaining part.

7. The parking brake system of claim 5, wherein the fluid pressure control device comprises a first control valve capable of switching between communicating with the fluid pressure source or a reservoir and a second control valve capable of switching between communicating with the fluid pressure source and the reservoir.

8. The parking brake system of claim 5, wherein the residual pressure of a parking control fluid pressure chamber is released when the lock piston is moved to one side completely.

9. A parking brake system comprising:
a fluid pressure source to activate disc brakes in response to a pedal operation, a fluid pressure control mechanism for controlling the fluid pressure source to selectively generate a parking control fluid pressure or a parking release control fluid pressure;
at least one casing operatively attached to the fluid pressure source and at least one brake caliper, the at least one casing having a parking piston slidably fitted therein at a first position;
a lock mechanism within the at least one casing situated at a first side of the parking piston wherein the lock mechanism automatically locks in response to movement of the parking piston toward a second side to mechanically lock the parking piston at a second position and unlocks;
the lock mechanism further comprising a hydraulically actuatable lock piston arranged orthogonal to the first side of the parking piston and operable to urge the parking piston from the first position toward the second position, the locking piston being slidably fitted in the casing.

10. The parking brake system of claim 9, wherein the lock piston comprises a first small diameter portion, a second large diameter portion at the end opposite the first small portion and a tapered portion connecting the first and second diameter portions.

11. The parking brake system of claim 10, wherein the lock mechanism includes a spherical body arranged between the tapered portion of the lock piston and the first side of the parking piston, the spherical body rollably contacts the tapered portion.

12. The parking brake system of claim 9, wherein the lock mechanism includes a spherical body rollably housed in the casing between the lock piston and the parking piston.

13. The parking brake system of claim 12, wherein the parking piston comprises a large diameter first end, a smaller diameter second end connected coaxially to the rear of the large diameter first end such that an annular step is formed between the large diameter first end and the smaller diameter second end.

14. The parking brake system of claim 9, wherein the fluid pressure source includes at least one electric motor driving at least one pump.

15. The parking brake system of claim 9, wherein the parking piston slidably moves from the first position to the second position, the lock mechanism locks the parking piston to achieve the parking brake mode substantially without using power.

16. A parking brake system, comprising:
a casing having a first hollow bore formed therein, said first hollow bore having a longitudinal axis, said casing further having a second hollow bore formed therein intersecting the first hollow bore and extending substantially orthogonal to the longitudinal axis of the first hollow bore, the second hollow bore having a small end and a large end opposite the small end, and a fluid pressure line in communication with the small end of the second hollow bore;
a parking piston slidably fitted into the first hollow bore of the casing so that a parking brake activation mode can be releasably achieved by forward movement of said parking piston in response to a parking control fluid pressure acting on a rear face side thereof, the parking piston having a hollow receiving recess formed centrally in a rear surface thereof;
a lock mechanism provided within the casing in back of the parking piston and configured so as to automatically lock in response to forward movement of the parking piston in order to mechanically lock the parking piston at a forward position and unlock in response to a parking release control fluid pressure acting on the lock mechanism;
a fluid pressure source; and
a fluid pressure control mechanism for controlling a fluid pressure generated from the fluid pressure source so that the parking control fluid pressure and the parking release control fluid pressure can be obtained;
wherein the lock mechanism comprises:

a hydraulically actuatable lock piston that is disposed to the rear of the parking piston and which has an axis orthogonal to the axis of the parking piston and that is operable to urge the parking piston forwardly in the hollow bore of the casing, the lock piston comprising:

a small diameter shaft at a first end thereof slidably supported in the casing, a large diameter tubular portion at the other end thereof and having a larger diameter than that of the small diameter shaft portion, the large diameter tubular portion being slidably supported in the casing and having a hollow space formed therein, and a tapered intermediate portion providing a connection between the small diameter shaft portion and the large diameter tubular portion;

a spring disposed in the hollow space of the lock piston and urging the lock piston in a parking brake-engaging direction; and a spherical ball disposed between the tapered portion of the lock piston and the rear end of the parking piston, wherein a portion of the spherical ball fits into the hollow receiving recess in the rear surface of the parking piston;

wherein opposite end parts of the lock piston are slidably fitted into and supported in the second hollow bore of the casing, such that the small diameter shaft fits into the small end thereof, and the tubular portion fits into the large end thereof.

* * * * *